US007430638B2

(12) United States Patent
Kellar

(10) Patent No.: US 7,430,638 B2
(45) Date of Patent: Sep. 30, 2008

(54) ADAPTIVE INPUT / OUTPUT COMPRESSED SYSTEM AND DATA CACHE AND SYSTEM USING SAME

(75) Inventor: John E. Kellar, Georgetown, TX (US)

(73) Assignee: Mossman Holdings LLC, Wilmington, DE (US)

( * ) Notice: Subject to any disclaimer, the term of this patent is extended or adjusted under 35 U.S.C. 154(b) by 372 days.

(21) Appl. No.: 11/152,363

(22) Filed: Jun. 14, 2005

(65) Prior Publication Data

US 2007/0005901 A1    Jan. 4, 2007

(51) Int. Cl.
G06F 12/00    (2006.01)
G06F 13/00    (2006.01)
G06F 13/28    (2006.01)
G06F 13/12    (2006.01)
G06F 13/38    (2006.01)
G06F 7/00    (2006.01)
G06F 17/00    (2006.01)

(52) U.S. Cl. .................. 711/118; 711/100; 711/135; 711/137; 710/68; 707/101

(58) Field of Classification Search .............. None
See application file for complete search history.

(56) References Cited

U.S. PATENT DOCUMENTS 5,357,618 A * 10/1994 Mirza et al. ............... 711/3
6,671,772 B1 * 12/2003 Cousins .................... 711/112

(Continued)

OTHER PUBLICATIONS

Handy, Jim, The Cache Memory Book, 1998, Academic Press LTD. 2nd ed., 3 pages.*

(Continued)

Primary Examiner—Hyung Sough
Assistant Examiner—Gary W Cygiel

(57) ABSTRACT

To improve caching techniques, so as to realize greater hit rates within available memory, of the present invention utilizes a entropy signature from the compressed data blocks to supply a bias to pre-fetching operations. The method of the present invention for caching data involves detecting a data I/O request, relative to a data object, and then selecting appropriate I/O to cache, wherein said selecting can occur with or without user input, or with or without application or operating system preknowledge. Such selecting may occur dynamically or manually. The method further involves estimating an entropy of a first data block to be cached in response to the data I/O request; selecting a compressor using a value of the entropy of the data block from the estimating step, wherein each compressor corresponds to one of a plurality of ranges of entropy values relative to an entropy watermark; and storing the data block in a cache in compressed form from the selected compressor, or in uncompressed form if the value of the entropy of the data block from the estimating step falls in a first range of entropy values relative to the entropy watermark. The method can also include the step of prefetching a data block using gap prediction with an applied entropy bias, wherein the data block is the same as the first data block to be cached or is a separate second data block. The method can also involve the following additional steps: adaptively adjusting the plurality of ranges of entropy values; scheduling a flush of the data block from the cache; and suppressing operating system flushes in conjunction with the foregoing scheduling step.

40 Claims, 26 Drawing Sheets

Entropy Bands and Compression Estimator Flow

U.S. PATENT DOCUMENTS

| | | | |
|---|---|---|---|
| 7,098,822 B2* | 8/2006 | Augenstein et al. | 341/87 |
| 2001/0001872 A1 | 5/2001 | Singh et al. | |
| 2005/0071579 A1* | 3/2005 | Luick | 711/154 |

OTHER PUBLICATIONS

Bulent Abali, "Operating System Support for Fast Hardware Compression of Main Memory Contents," Memory Wall Workshop, 27th Ann. Int. Sym. on Computer Architecture (ISCA 2000), Jun. 11, 2000, Vancouver, B.C.

Sumit, Roy, "Improving System Performance with Compressed Memory," (sumit@hpl.hp.com).

Irina Chihaia, "An Analytical Model for Software-Only Main Memory Compression," WMPI 2004, Munich, Germany.

Ian McDonald, "Distributed, Object-based Memory Management in an Operating System Supporting Quality of Service," (ian@dcs.gla.ac.uk) http://www.dcs.gla.ac.uk/~ian/.

Sangduck Park, "Compressed Swapping for NAND Flash Memory Based Embedded Systems," School of Electrial Engineering, Seoul National University, Gwanak-gu, Seoul 151-742 Korea (parksd@dsp.snu.ac.kr).

Bulent Abali, "Performance of Hardware Compressed Main Memory," IBM T.J. Watson Research Center, P.O. Box 218, Yorktown Heights, NY 10598 (abali@us.ibm.com).

Fred Douglis, "The Compression Cache: Using On-Line Compression to Extend Physical Memory," Winter 1993 USENIX Conference, Jan. 1993, pp. 519-529.

Paul R. Wilson, "The Case for Compressed Caching in Virtual Memory Systems," Proceedings of the USENIX Annual Technical Conference, Jun. 6-11, 1999, Monterey, California, USA.

Scott Frederick Kaplan, B.A., "Compressed Caching and Modern Virtual Memory Simulation," Dissertation Doctor of Philosophy, The University of Texas at Austin, Dec. 1999, Chapters 5-6, pp. 169-304.

* cited by examiner

Opened File Policy -- GUI settings to an opened file policy

| Tracking Spec (parent) of the opened file/dir | | writeback | | | |
|---|---|---|---|---|---|
| | | no flags | no_buff | wt | wt & no_buff |
| 25 | ignored parent | nocache | nocache | nocache | nocache |
| | dynamic parent | wb | nocache | wt | nocache |
| | dynamic parent + nc | wb | wb | wb | wb |
| | manual wb tracked parent | wb | wb | wb | wb |
| Default Flag 24 | manual wb tracked parent + nc | wb | wb | wb | wb |
| | manual wt tracked parent (not supported in GUI) | wt | wt | wt | wt |
| | manual wt tracked parent + nc (not supported in GUI) | wt | wt | wt | wt |

| Tracking Spec (parent) of the opened file/dir | not writeback | | | |
|---|---|---|---|---|
| | no flags | no_buff | wt | wt & no_buff |
| ignored parent | nocache | nocache | nocache | nocache |
| dynamic parent | - | - | - | - |
| dynamic parent + nc | - | - | - | - |
| manual wb tracked parent | wt | wt | wt | wt |
| manual wb tracked parent + nc | - | - | - | - |
| manual wt tracked parent (not supported in GUI) | wt | wt | wt | wt |
| manual wt tracked parent + nc (not supported in GUI) | - | - | - | - |

FTF = File Tracking Table
nc = Non-Conservative caching
wb = writeback
wt = writethrough

*Fig. 2D*

Flags for tracking specifications in "TrackedFiles" reg key

21

| Flag | Value |
|---|---|
| writeback | 1 |
| writethrough | 2 |
| no cache | 4 |
| directory | 0×10 |

File tracking flags (4 bits = 1 hex digit each)

28

| | WT | NO_BUFF | default | pagefile | dynamic |
|---|---|---|---|---|---|
| writeback | 1 | 1 | 1 | 1 | 1 |
| writethrough | 2 | 2 | 2 | 2 | 2 |
| no cache | 4 | 4 | 4 | 4 | 4 |

GUI Settings to File Tracking Flags Table

20

| | writeback | wb + nc (+ignore flush) | not writeback |
|---|---|---|---|
| dynamic | 0×24441 | 0×11441 | n/a |
| manual | 0×11444 | 0×11444 | 0×22444 |

Cache Untracked Files (meta data and files opened before compression cache is started)
Not supported in GUI -- change the "default" entry in the file tracking flags to 1

*Fig. 2E*

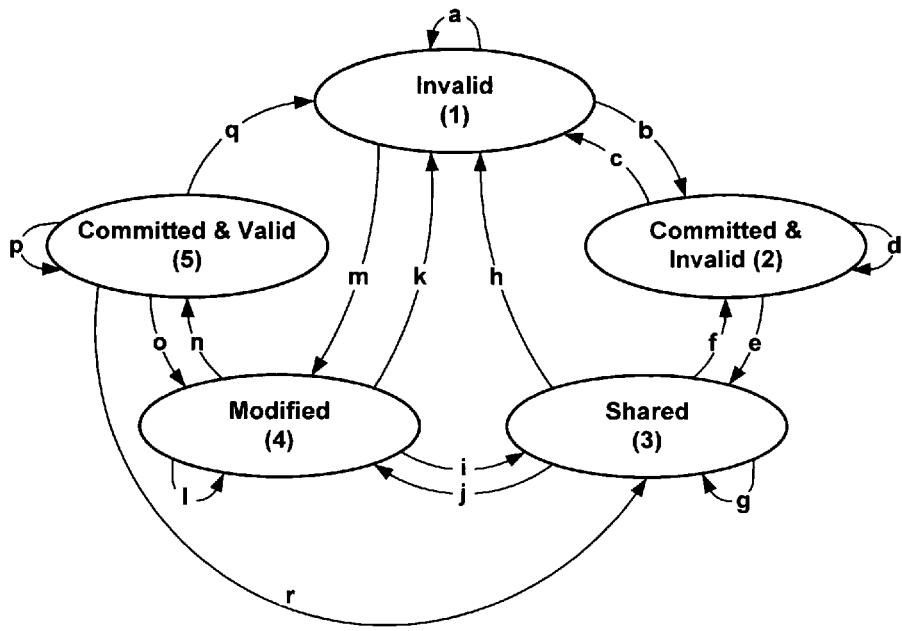

| | Read | Write | Flush | Invalidate |
|---|---|---|---|---|
| Invalid | d, Shared | a, Modified | NA | NA |
| Shared | e, Shared | f, Modified | e, Shared | c, Invalid |
| Modified | h, Modified | h, Modified | g, Shared | b, Invalid |

| | Read | Write | Flush | Invalidate |
|---|---|---|---|---|
| Invalid | Shared, if NC, Invalid | Invalid, If AOW & WB, Modified If AOW & WT, Shared | Invalid | Invalid |
| Committed & Invalid | CI: Request is queued and completed when I/O is complete | Modified, Subsequent I/O Completion is cancelled/ignored | CI | Invalid |
| Shared | Shared, if NC, Shared & Increment Invalid State Ctr | WB: Modified WT: Shared | Shared | Invalid |
| Modified | Modified, If NC, Modified & Increment Invalid State Ctr | Modified | C&M | Invalid |
| Committed & Valid | C&V If NC, C&V & increment Invalid State Ctr | C&V: Write update is reissued | Shared | Invalid |

Fig. 4A
*Modified MSI Cache Protocol*

State Transitions for Write Invalidation

Main Data Flow

*File Tracking Flow*

*Dynamic Tracking Enabled*

Dynamic Tracking Enabled Read I/O Operation

Dynamic Tracking Enabled
Write I/O Operation

Dynamic Tracking Enabled
Read I/O Operation
Prefetch Enabled

| Table Entries | Explanation |
|---|---|
| Tag | Cache data block tag itself |
| RequestsList | Queues "flight" IRP requests, for flushes |
| Field | Best effort match to an open file |
| Disk | Disk cache data with which block is associated |
| State | Clean, dirty, inflight, invalid |
| Age | Prefetch and Least Frequently Used (LFU) counter, incrementing by 2 or will decrementing by 2, if decrements by 2 (from a default value of 2) then no hits in x time) if incrementing by 2 (max hits since last reference) |
| 312 CompressorType | Compressor selected for this block; currently can be one of: LZ type; zero-bit; zero-compress (equivalent of a memory copy) |
| 314 CompressionRatio | Compression ratio of this block |
| 310 Entropy | Entropy value of data block |
| TimeTag | Least Recently Used (LRU) counter (also miss counter) |
| Compressed Block List | Pointer to the list of compressed blocks |

Fig. 7E
Cache Data Block Tag
Reference Counters and
Informational Counters

*Entropy Bands and Compression Estimator Flow*

Basic Flow of a Data Write Request
Through the Dispatch Routine

ADAPTIVE INPUT / OUTPUT COMPRESSED SYSTEM AND DATA CACHE AND SYSTEM USING SAME

BACKGROUND OF THE INVENTION

1. Field of the Invention

The present invention relates, in general, to data processing systems and more particularly to adaptive data caching in data processing systems to reduce transfer latency or increase transfer bandwidth of data movement within these systems.

2. Description of the Related Art

In modern data processing systems, the continual increase in processor speeds has outpaced the rate of increase of data transfer rates from peripheral persistent data storage devices and sub-systems. In systems such as enterprise scale server systems in which substantial volumes of volatile, or persistent data are manipulated, the speed at which data can be transferred may be the limiting factor in system efficiency. Commercial client/server database environments are emblematic of such systems. These environments are usually constructed to accommodate a large number of users performing a large number of sophisticated database queries and operations to a large distributed database. These compute, memory and I/O intensive environments put great demands on database servers. If a database client or server is not properly balanced, then the number of database transactions per second that it can process can drop dramatically. A system is considered balanced for a particular application when the CPU(s) tends to saturate about the same time as the I/O subsystem.

Continual improvements in processor technology have been able to keep pace with ever-increasing performance demands, but the physical limitations imposed on retrieving data from disk has caused I/O transfer rates to become an inevitable bottleneck. Bypassing these physical limitations has been an obstacle to overcome in the quest for better overall system performance.

In the computer industry, this bottleneck, known as a latency gap because of the speed differential, has been addressed in several ways. Caching the data in memory is known to be an effective way to diminish the time taken to access the data from a rotating disk. Unfortunately, memory resources are in high demand on many systems, and traditional cache designs have not made the best use of memory devoted to them. For instance, many conventional caches simply cache data existing ahead of the last host request. Implementations such as these, known as Read Ahead caching, can work in unique situations, but for non-sequential read requests, data is fruitlessly brought into the cache memory. This blunt approach to caching however has become quite common due to simplicity of the design. In fact, this approach has been put in use as read buffers within the persistent data storage systems such as disks and disk controllers.

Encoding or compressing cached data in operating system, system caches increase the logical effective cache size and cache hit rate, and thus improves system response time. On the other hand, compressed data requires variable-length record management, free space search and garbage collection. This overhead may negate performance improvements achieved by increasing effective cache size. Thus, there is a need for a new operating system, system file, data and buffer cache data managing method with low overhead, transparent to the operating systems in conventional data managing methods. With such an improved method, it is expected that the effective, logically accessible, memory available for file and data buffer cache size will increase by 30% to 400%, effectively improving system-cost performance.

Ideally, a client should not notice any substantial degradation in response time for a given transaction even as the number of transactions requested per second by other clients to the database server increases. The availability of main memory plays a critical role in a database server's ability to scale for this application. In general, a database server will continue to scale up until the point that the application data no longer fits in main memory. Beyond this point, the buffer manager resorts to swapping pages between main memory and storage sub-systems. The amount of this paging increases exponentially as a function of the fraction of main memory available, causing application performance and response time to degrade exponentially as well. At this point, the application is said to be I/O bound.

When a user performs a sophisticated data query, thousands of pages may be needed from the database, which is typically distributed across many storage devices, and possibly distributed across many systems. To minimize the overall response time of the query, access times must be as small as possible to any database pages that are referenced more than once. Access time is also negatively impacted by the enormous amount of temporary data that is generated by the database server, which normally cannot fit into main memory, such as the temporary files generated for sorting. If the buffer cache is not large enough, then many of those pages will have to be repeatedly fetched to and from the storage sub-system.

Independent studies have shown that when 70% to 90% of the working data fits in main memory, most applications will run several times slower. When only 50% fits, most run 5 to 20 times slower. Typical relational database operations run 4 to 8 times slower when only 66% of the working data fits in main memory. The need to reduce or eliminate application page faults, data or file system I/O is compelling. Unfortunately for system designers, the demand for more main memory by database applications will continue to far exceed the rate of advances in memory density. Coupled with this demand from the application area comes competing demands from the operating system, as well as associated I/O controllers and peripheral devices. Cost-effective methods are needed to increase the, apparent, effective size of system memory.

It is difficult for I/O bound applications to take advantage of recent advances in CPU, processor cache, Front Side Bus (FSB) speeds, >100 Mbit network controllers, and system memory performance improvements (e.g., DDR2) since they are constrained by the high latency and low bandwidth of volatile or persistent data storage subsystems. The most common way to reduce data transfer latency is to add memory. Adding memory to database servers may be expensive since these applications demand a lot of memory, or may even be impossible, due to physical system constraints such as slot limitations. Alternatively, adding more disks and disk caches with associated controllers, or Network Attached Storage (NAS) and network controllers or even Storage Aware Network (SAN) devices with Host Bus Adapters (HBA's) can increase storage sub-system request and data bandwidth. It may be even necessary to move to a larger server with multiple, higher performance I/O buses. Memory and disks are added until the database server becomes balanced.

First, the memory data encoding/compression increases the effective size of system wide file and/or buffer cache by encoding and storing a large block of data into a smaller space. The effective available reach of these caches is typically doubled, where reach is defined as the total immediately accessible data requested by the system, without recourse to out-of-core (not in main memory) storage. This allows client/server applications, which typically work on data sets much larger than main memory, to execute more efficiently due to the decreased number of volatile, or persistent, storage data requests. The numbers of data requests to the storage sub-systems are reduced because pages or disk blocks that have been accessed before are statistically more likely to still be in main memory when accessed again due to the increased capacity of cache memory. A secondary effect of such compression or encoding is reduced latency in data movement due to the reduced size of the data. Basically, the average compression ratio tradeoff against the original data block size as well as the internal cache hash bucket size must be balanced in order to reap the greatest benefit from this tradeoff. The Applicant of the present invention believes that an original uncompressed block size of 4096 bytes with an average compression ratio of 2:1 stored internally in the cache, in a data structure known as an open hash, in blocks of 256 bytes results in the greatest benefit towards reducing data transfer latency for data movement across the north and south bridge devices as well as to and from the processors across the Front-Side-Bus. The cache must be able to modify these values in order to reap the greatest benefits from this second order effect.

There is a need to improve caching techniques, so as to realize greater hit rates within the available memory of modern systems. Current hit rates, from methods such as LRU (Least Recently Used), LFU (Least Frequently Used), GCLOCK and others, have increased very slowly in the past decade and many of these techniques do not scale well with the availability of the large amounts of memory that modern computer systems have available today. To help meet this need, the present invention utilizes a entropy signature from the compressed data blocks to supply a bias to pre-fetching operations. This signature is produced from the entropy estimation function described herein, and stored in the tag structure of the cache. This signature provides a unique way to group previously seen data; this grouping is then used to bias or alter the pre-fetching gaps produced by the prefetching function described below. Empirical evidence shows that this entropy signature improve pre-fetching operations over large data sets (greater than 4 GBytes of addressable space) by approximately 11% over current techniques that do not have this feature available.

There is also a need for user applications to be able to access the capabilities for reducing transfer latency or increasing transfer bandwidth of data movement within these systems. There is a further need to supply these capabilities to these applications in a transparent way, allowing an end-user application to access these capabilities without requiring any recoding or alteration of the application. The Applicant of the present invention believes this may be accomplished through an in-core file-tracking database maintained by the invention. Such a core file-tracking data base would offer seamless access to the capabilities of the invention by monitoring file open and close requests from the user-application/operating system interface, decoding the file access flags, while maintaining an internal list of the original file object name and flags, and offering the capabilities of the invention to appropriate file access. The in-core file-tracking database would also allow the end-user to over-ride an application's caching request and either allow or deny write-through or write-back or non-conservative or no-caching to an application on a file by file basis, through the use of manual file tracking or, on a system wide basis, through the use of dynamic file tracking. This capability could also be offered in a more global, system-wide way by allowing caching of file system metadata; this caching technique (the caching of file system metadata specifically) is referred to throughout this document as "non-conservative caching."

There is a further need to allow an end-user application to seamlessly access PAE (Physical Address Extension) memory for use in file caching/data buffering, without the need to re-code or modify the application in any way. The PAE memory addressing mode is limited to the Intel, Inc. x86 architecture. There is a need for replacement of the underlying memory allocator to allow a PAE memory addressing mode to function on other processor architectures. This would allow end-user applications to utilize the modern memory addressing capabilities without the need to re-code or modify the end-user application in any way. This allows transparent seamless access to PAE memory, for use by the buffer and data cache, without user intervention or system modification.

Today, large numbers of storage sub-systems are added to a server system to satisfy the high I/O request rates generated by client/server applications. As a result, it is common that only a fraction of the storage space on each storage device is utilized. By effectively reducing the I/O request rate, fewer storage sub-system caches and disk spindles are needed to queue the requests, and fewer disk drives are needed to serve these requests. The reason that the storage sub-system space is not efficiently utilized is that, on today's hard-disk, storage systems, access latency increases as the data written to the storage sub-system moves further inward from the edge of the magnetic platter, in order to keep access latency at a minimum system designers over-design storage sub-systems to take advantage of this phenomenon. This results in under-utilization of available storage. There is a need to reduce average latency to the point that this trade-off is not needed, resulting in storage space associated with each disk that can be more fully utilized at an equivalent or reduced latency penalty.

In addition, by reducing the size of data to be transferred between local and remote persistent storage and system memory, the I/O and Front Side Buses (FSB) are utilized less. This reduced bandwidth requirement can be used to scale system performance beyond its original capabilities, or allow the I/O subsystem to be cost reduced due to reduced component requirements based on the increased effective bandwidth available.

Thus, there is a need in the art for mechanisms to balance the increases in clock cycles of the CPU and data movement latency gap without the need for adding additional volatile or persistent storage and memory sub-systems or increasing the clock cycle frequency of internal system and I/O buses. Furthermore, there is a need to supply this capability transparently to end user applications so that they can take advantage of this capability in both a dynamic and a directed way.

SUMMARY OF THE INVENTION

There is a need to improve caching techniques, so as to realize greater hit rates within the available memory of modern systems. Current hit rates, from methods such as LRU (Least Recently Used), LFU (Least Frequently Used), GCLOCK and others, have increased very slowly in the past decade and many of these techniques do not scale well with the availability of the large amounts of memory that modern computer systems have available today. To help meet this need, the present invention utilizes a entropy signature from the compressed data blocks to supply a bias to pre-fetching operations. This signature is produced from the entropy estimation function described herein, and stored in the tag structure of the cache. This signature provides a unique way to group previously seen data; this grouping is then used to bias or alter the pre-fetching gaps produced by the prefetching function described below. Empirical evidence shows that this entropy signature improve pre-fetching operations over large data sets (greater than 4 GBytes of addressable space) by approximately 11% over current techniques that do not have this feature available.

The method for caching data in accordance with the present invention involves detecting a data input/output request, relative to a data object, and then selecting appropriate I/O to cache, wherein said selecting can occur with or without user input, or with or without application or operating system preknowledge. Such selecting may occur dynamically or manually. The method of the present invention further involves estimating an entropy of a data block to be cached in response to the data input/output request; selecting a compressor using a value of the entropy of the data block from the estimating step, wherein each compressor corresponds to one of a plurality of ranges of entropy values relative to an entropy watermark; and storing the data block in a cache in compressed form from the selected compressor, or in uncompressed form if the value of the entropy of the data block from the estimating step falls in a first range of entropy values relative to the entropy watermark. The method for caching data in accordance with the present invention can also include the step of prefetching a data block using gap prediction with an applied entropy bias, wherein the data block is the data block to be cached, as referenced above, or is a separate second data block. The method of the present invention can also involve the following additional steps: adaptively adjusting the plurality of ranges of entropy values; scheduling a flush of the data block from the cache; and suppressing operating system flushes in conjunction with the foregoing scheduling step.

The foregoing has outlined rather broadly the features and technical advantages of the present invention in order that the detailed description of the invention that follows may be better understood. Additional features and advantages of the invention will be described hereinafter, which form the subject of the claims of the invention.

BRIEF DESCRIPTION OF THE DRAWINGS

The present invention may be better understood, and its numerous objects, features, and advantages made apparent to those skilled in the art by referencing the accompanying drawings. The use of the same reference number throughout the several figures designates a like or similar element.

FIG. 2D is a table showing opened file policy for cache in accordance with an embodiment of the present invention;

FIG. 2E illustrates the flags used for file tracking specifications in accordance with an embodiment of the present invention;

FIG. 4A shows a modified MSI cache protocol, wherein the MSI protocol is modified in accordance with the present inventive design principals;

FIG. 7E is a schematic representation of a data structure in accordance with an embodiment of the present invention;

DESCRIPTION OF THE PREFERRED EMBODIMENT(S)

Figure 1A:
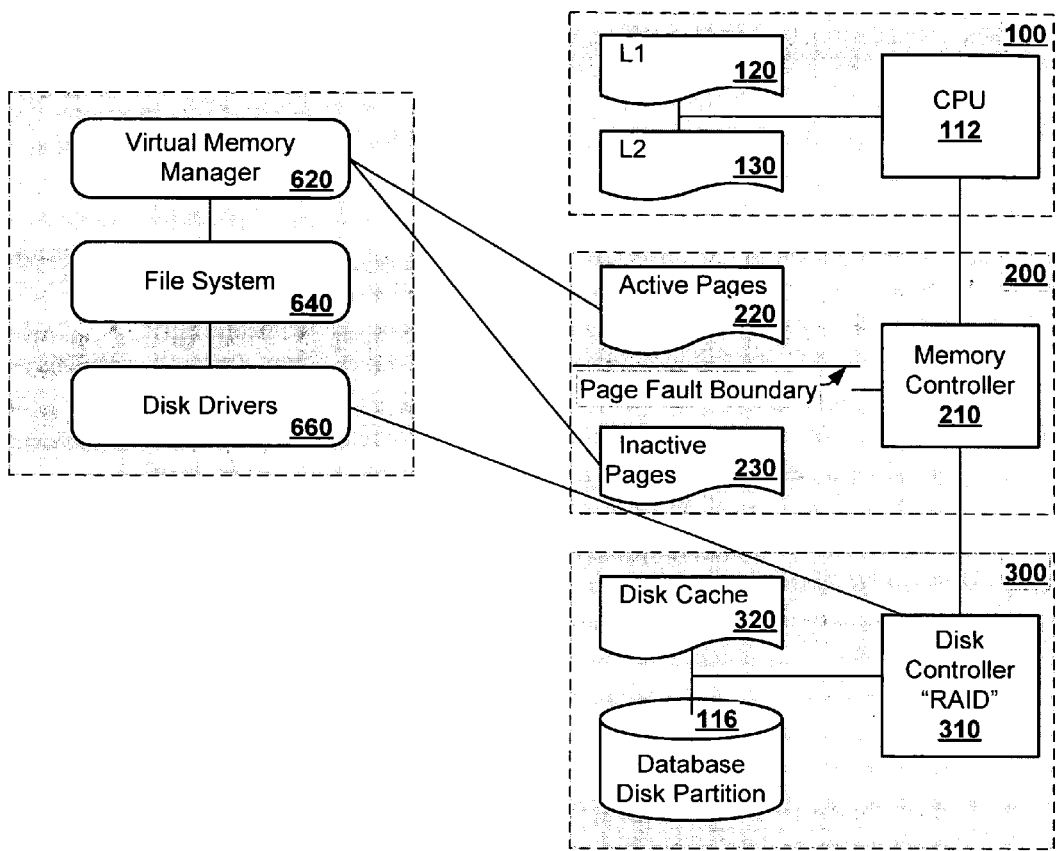
FIG. 1A (prior art) depicts a generalized system architecture of a modern data processing system.

In the following description, numerous specific details are set forth such as specific word or byte lengths, etc. to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

FIG. 1A (prior art) depicts a generalized system architecture of a modern data processing system.

Figure 1B:
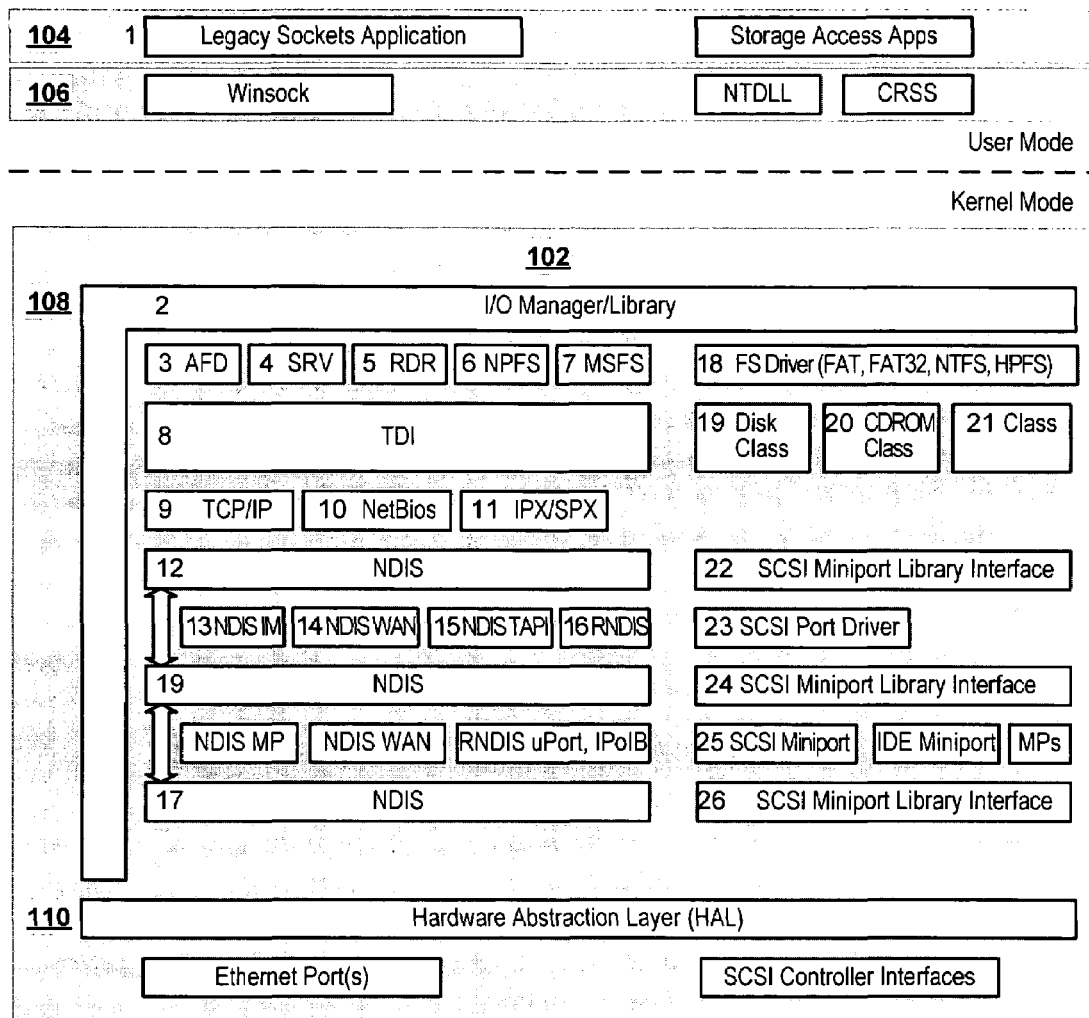
FIG. 1B (prior art) depicts generalized software architecture for the I/O subsystem of Windows 2000, XP, and beyond.

FIG. 1B (prior art) depicts generalized software architecture for the I/O subsystem of Windows 2000, XP, and beyond. This diagram is not intended to be literally accurate, but a generalized view of the software components, and how they exist within the system from a hierarchical point of view. This diagram utilizes the Windows operating system only for illustrative purposes, as the present inventive embodiment may be implemented in any modern operating system in fundamentally the same way. Note that this figure illustrates both a file and data cache, as well as a network controller device cache. The present invention may be adapted to either a network controller device or a disk controller device using the same inventive design principles discussed below.

Figure 2A:
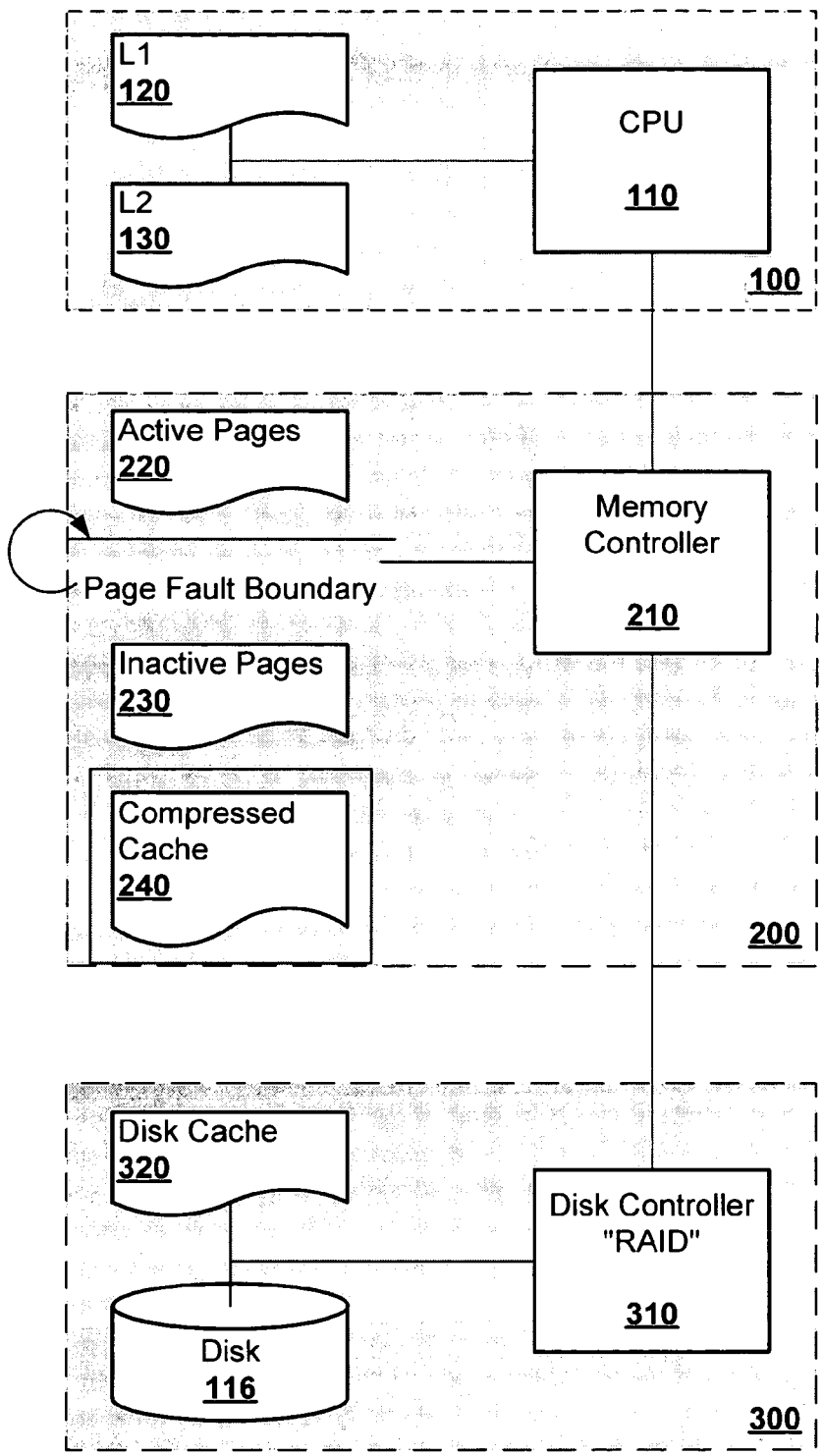
FIG. 2A illustrates a high-level logical view of an adaptive compressed cache architecture in accordance with the present inventive principles.

FIG. 2A illustrates a high-level logical view of an adaptive compressed cache architecture in accordance with the present inventive principles.

Figure 2B:
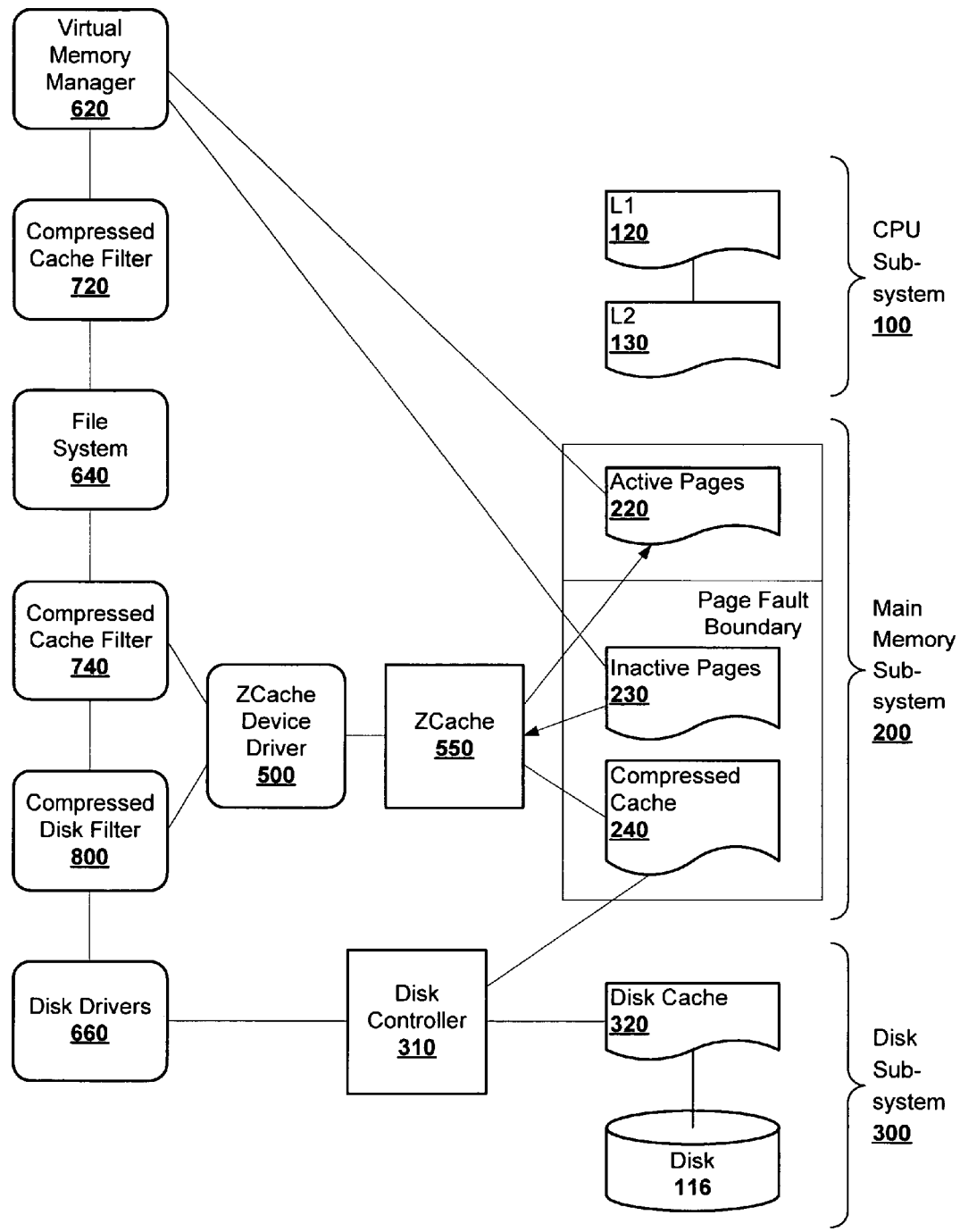
FIG. 2B illustrates, in more detail, a high-level logical view of an adaptive compressed cache.

FIG. 2B illustrates, in more detail, a high-level logical view of an adaptive compressed cache.

Figure 2C:
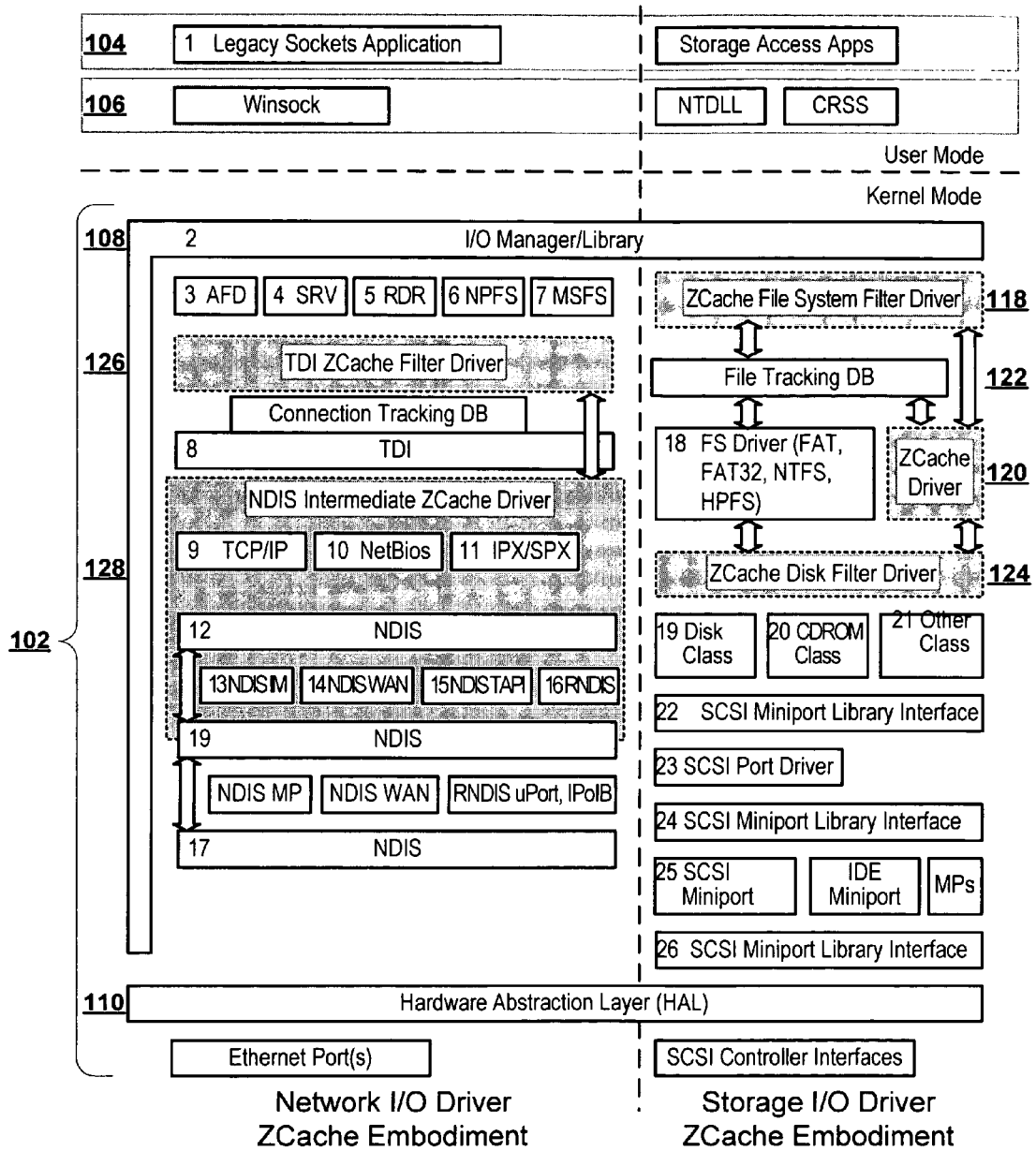
FIG. 2C illustrates a logical view of an adaptive compressed caching architecture in accordance with the present inventive principals.

FIG. 2C illustrates a logical view of an adaptive compressed caching architecture 100 in accordance with the present inventive principles. Modern data processing systems may be viewed from a logical perspective as a layered structure 102 in which a software application 104 occupies the top level, with the operating system (OS) application program interfaces (APIs) 106 between the application and the OS 108. OS APIs 106 expose system services to the application 104. These may include, for example, file input/output (I/O), network I/O, etc. Hardware devices are abstracted at the lowest level 110. Hardware devices (see FIGS. 2A and 2B) may include the central processing unit (CPU) 112, memory, persistent storage (e.g., disk controller 114), and other peripheral devices 116. In the logical view represented in FIG. 2C, these are handled on an equal footing. That is, each device "looks" the same to the OS.

In accordance with the present inventive principles, filter driver 118 intercepts the operating system file access and performs caching operations, described further herein below, transparently. That is, the caching, file tracking and, in particular, the compression associated therewith, is transparent to the application 104. Data selected for caching is stored in a (compressed) cache (denoted as ZCache 120). (The "ZCache" notation is used as a mnemonic device to call attention to the fact that the cache in accordance with the present invention is distinct from the instruction/data caches commonly employed in modern microprocessor systems, and typically denoted by the nomenclature "L1", "L2" etc. cache. Furthermore the 'Z' is a common mnemonic used to indicate compression or encoding activity.) In an embodiment of the present invention, ZCache 120 may be physically implemented as a region in main memory. Filter 118 maintains a file tracking database (DB) 122 which contains information regarding which files are to be cached or not cached, and other information useful to the management of file I/O operations, as described further herein below. Although logically part of filter driver 118, physically, file tracking DB 122 may be included in ZCache 120.

A few notes on FIG. 2C:

1) The preferred embodiment of the File system driver layers itself between boxes #2 (I/O Manager Library) and #18 (FS Driver).

2) The disk filter layers itself between boxes #18 (FS Driver) and the boxes in the peer group depicted by #19 (Disk Class), #20 (CD-ROM Class), and #21 (Class).

3) The ZCache module exists as a stand-alone device driver adjunct to the file system filter and disk filter device drivers.

4) A TDI Filter Driver is inserted between box (TDI) 8, with connection tracking for network connections that operates the same as the file tracking modules in the compressed data cache, and the peer group of modules that consist of(AFD) 3, (SRV) 4, (RDR) 5, (NPFS) 6, and (MSFS) 7. A complete reference on TDI is available from the MSDN (Microsoft Developer Network).

5) A NDIS intermediate cache driver is inserted between the bottom edge of the transport drivers and the upper edge of the NDIS components.

Figure 3:
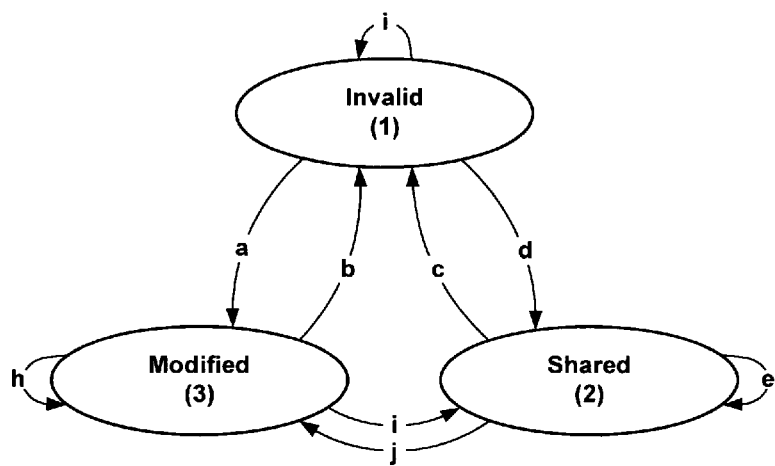
FIG. 3 illustrates a cache protocol in a state diagram format view in accordance with the present state of the art principals.

FIG. 3 illustrates a cache protocol, in a state diagram format view and in accordance with the present state of the art principles. This state diagram describes the Modified-Shared-Invalid (MSI) Cache protocol. This cache protocol is one used on processor caches, and is closest to what is needed for a block-based cache. Other possible cache protocols which are not precluded by this preferred embodiment include MESI, MOESI, Dragon and others.

The definitions of the states shown in FIG. 2 are:

1) Invalid: The cache line does not contain valid data.

2) Shared: The cache line contains data, which is consistent with the backing store in the next level of the memory hierarchy.

3) Modified: The cache line contains the most recent data, and is different than data contained in backing store.

FIG. 4A shows the modified MSI cache protocol. In accordance with present inventive design principles, the MSI protocol must be modified, as in FIG. 4A, to accomplish the present inventive design goals. Many factors are considered in development of caching protocols, and most of the above-mentioned cache protocols are of a general purpose only, or are designed for a specific target implementation, such as a processor (CPU) cache. In order to meet the design goals of the present inventive principles other cache protocol factors, rather than only those embodied by the MSI protocol, must be considered.

Other caching protocols factors to consider are:
1) Read/Write ordering consistency
2) Allocate on Write Policy
3) Write-through, Write-Back, and Non-cacheable attributes
4) Blocking vs. a Non-Blocking design
5) Support for hardware codec support
6) Squashing support to save I/O Requests Another important item to consider when applying this concept to the invention's cache protocol is the high latencies associated with issuing and completing disk I/Os. It is necessary to break apart the MSI Shared and Modified states to take into consideration the following cases:

1) A cache line is allocated, but the disk I/O may not complete in hundreds if not thousands of microseconds. During this time, additional I/O requests could be made against the same allocated cache line.

2) Dynamically changing cache policies based on file-stream attributes, in different process contexts.

3) Take maximum advantage of the Asynchronous I/O model.

Figure 4B:
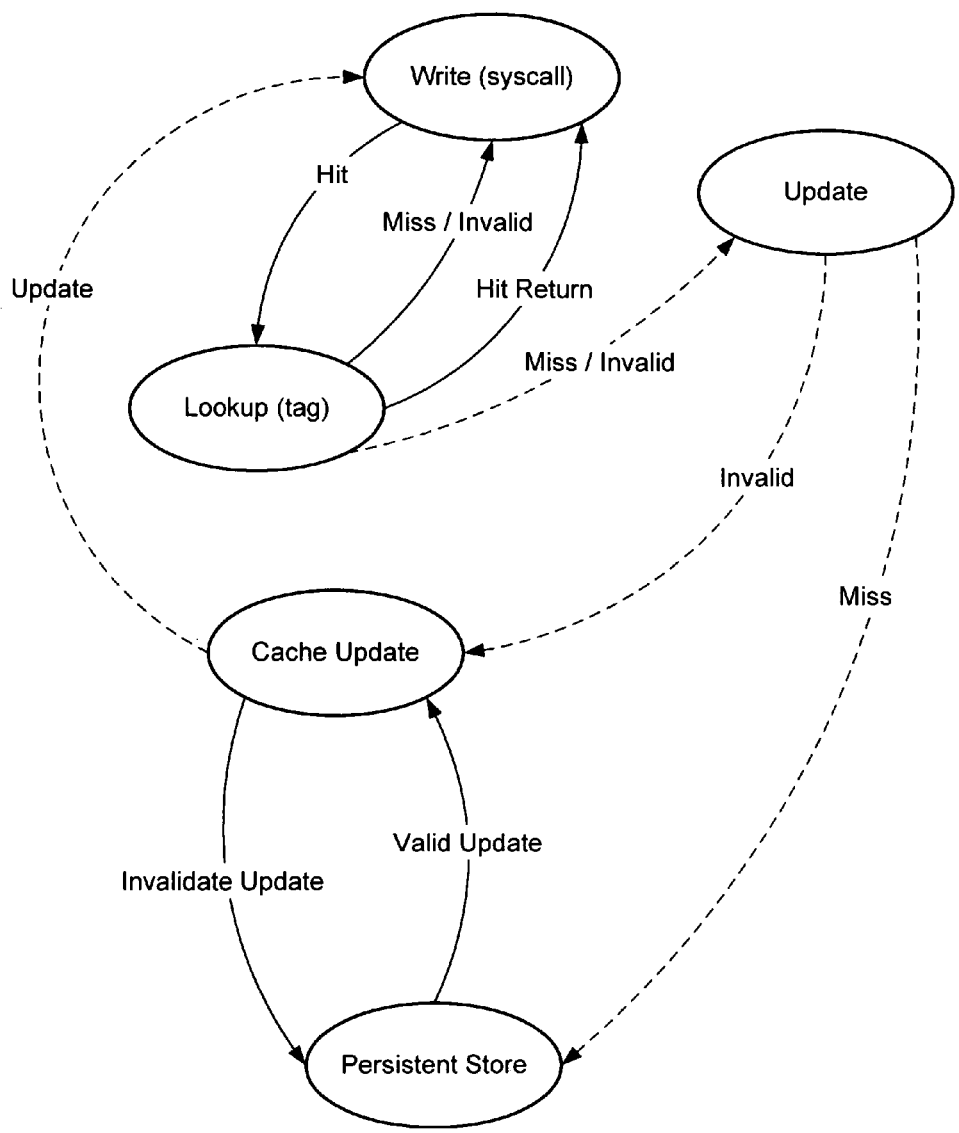
FIG. 4B shows state transitions for write-invalidation in accord with the present inventive design principles.

Application of these considerations is shown in the state diagram FIG. 4B, which shows state transitions for write-invalidation in accord with the present inventive design principles.

Many operating systems have features that can be exploited for maximum performance benefit. As previously mentioned, some of these feature are Asynchronous I/O models, I/O Request Packets or IRPS that can be pended, managed and queued by intermediate drivers, and internal list manipulation techniques, such as look-aside lists or buddy lists. These features may vary slightly from operating system to operating system; none of these features are precluded or required by the present inventive design principles.

Figure 5:
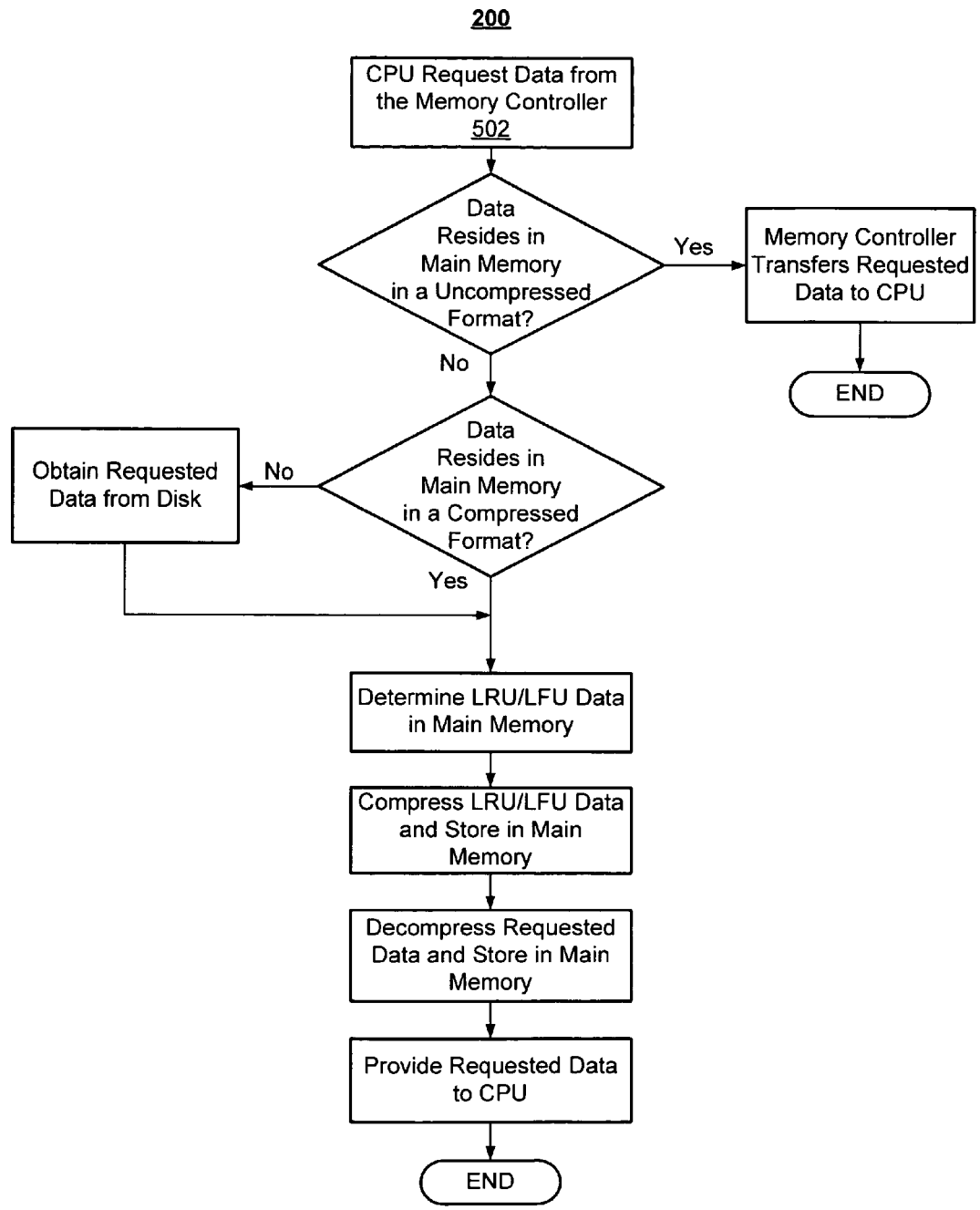
FIGS. 5 and 6 are flow diagrams illustrating implementation details in accordance with an embodiment of the present invention.

Refer now to FIG. 5 that illustrates in flow chart form, an adaptive, transparent compression caching methodology 200 in accordance with the present inventive principles. In the logical view of FIG. 2C, methodology 200 may be primarily performed by filter driver 118, or alternatively, may be logically between filter driver 118 and ZCache driver 120.

Figure 6:
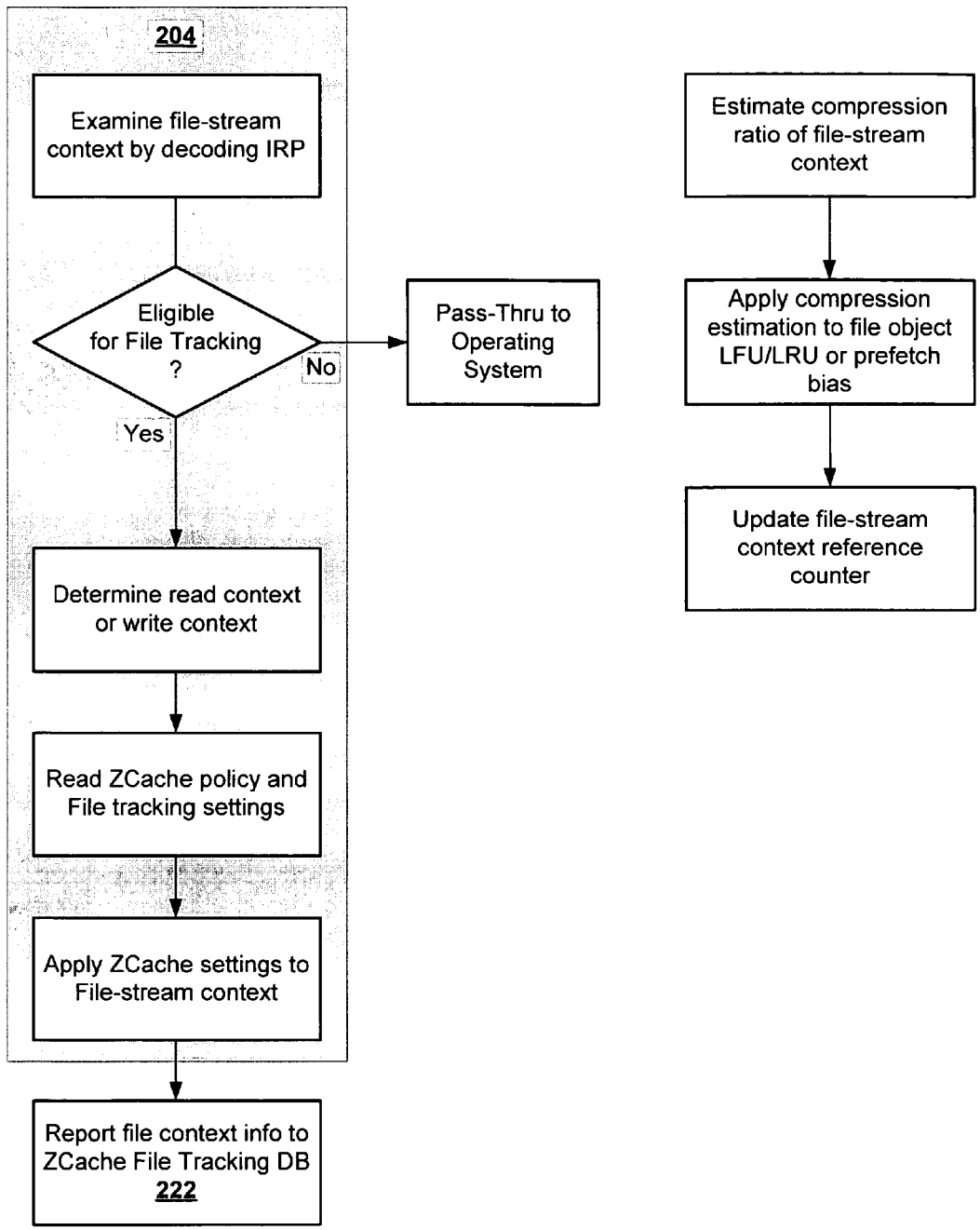
Figure 7A:
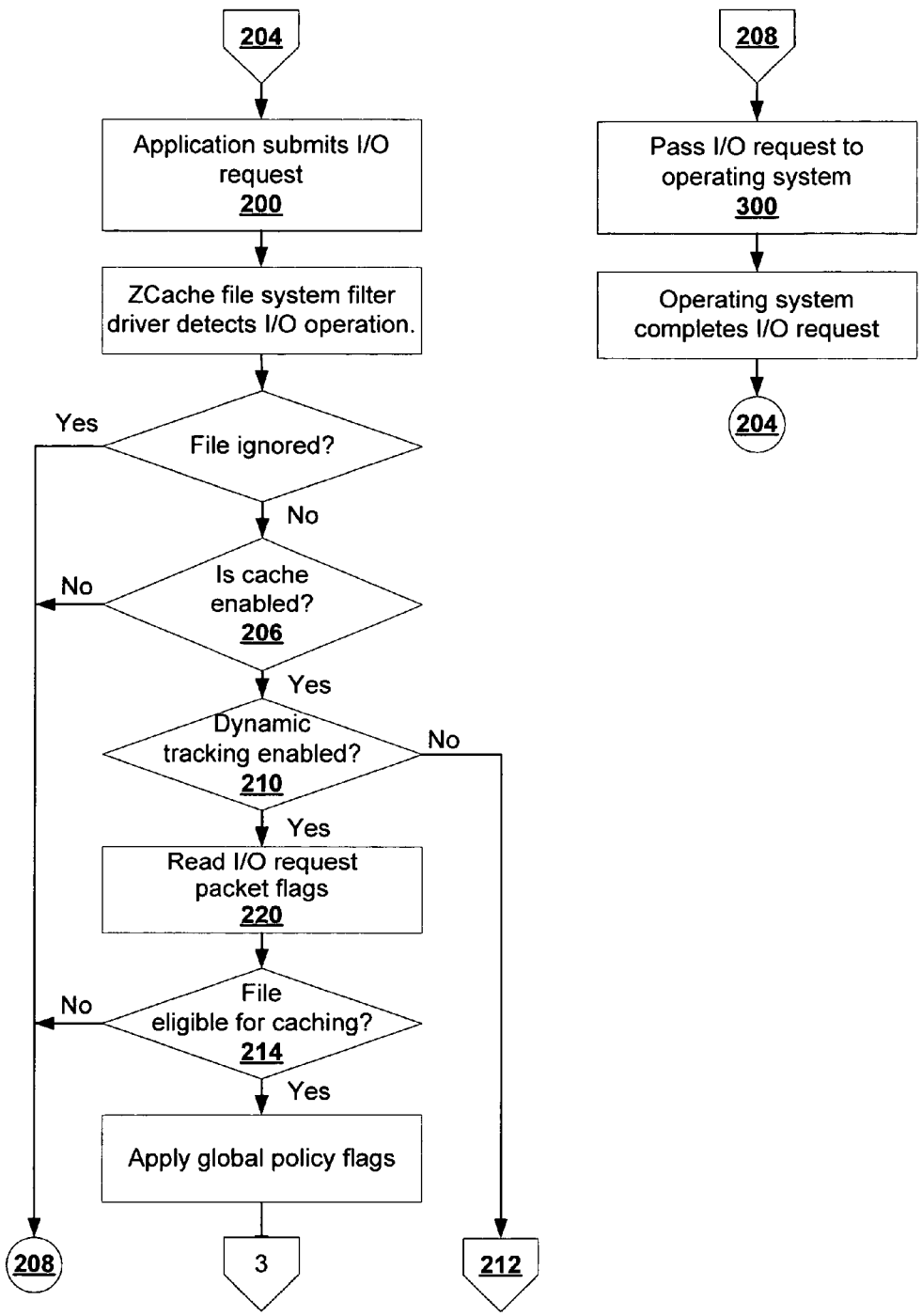
FIG. 7A-7D are further flow diagrams illustrating implementation details in accordance with an embodiment of the present invention.

Methodology 200 watches for I/O operations involving data block moves, in step 502. See FIG. 5. As illustrated in FIG. 6, a data block move may be detected by "peeking" at, or disassembling, the I/O request packets that control the handling of I/O operations. If an I/O operation involving data block moves is detected, methodology 200 performs operations to determine if the subject data is to be cached. This is described in conjunction with step 204 of FIG. 6 and steps 204-214 of FIG. 7A. In general, caching decisions are based on user-selectable caching policies in combination with caching "instructions" that may be set by the application making the data transfer request. Step 204 instructs the operating system how a I/O operation should be handled. In particular, each I/O packet includes descriptive data that may include information (i.e. "flags") for control the caching of the data transported in the packet.

Firstly, the user may specify a list of files to be ignored. If, in step 204, the subject file of the data move is in the "ignored" list, process 200 returns to step 208 to continue to watch for data block moves. Otherwise, in step 206, it is determined if caching is turned off in accordance with a global caching policy. As discussed in conjunction with FIG. 2C, a file-tracking database 122 (equivalently, a file tracking "registry") may be maintained in accordance with caching architecture 100. This registry may include a set of file tracking flags 20, FIG. 2E. In an embodiment of file tracking flags 20, each entry may be a hexadecimal (hex) digit. GlobalPolicy flag 21, which may be set by the user, may be set to determine the global policy that determines the most aggressive policy for any file. In other words, as described further below, other parameters may override the global policy to reduce the aggressiveness for a particular file. The values GlobalPolicy flag 21 may take predetermined values (e.g., a predetermined hex digit) representing respective ones of a writeback policy, writethrough policy and no caching. Writeback caching means that a given I/O write request may be inserted in the ZCache instead of immediately writing the data to the persistent store. Writethrough caching means that the data is also immediately written to the persistent store. If, in step 206, caching is turned off, such as if GlobalPolicy flag 21 is set to a predetermined hex value representing "no cache," process 200 passes the I/O request to the operating system (OS) for handling, step 208. Otherwise, process 200 proceeds to step 210.

In decision block 210, it is determined if dynamic, manual or alternatively, non-conservative tracking is set. This may be responsive to a value of Dynamic flag 28, FIG. 2E. In an embodiment of the present invention, if the value of the flag is "writethrough," the dynamic tracking is enabled, and if the value of the flag is "no cache," manual tracking is enabled. (Manual tracking allows the user to explicitly list in the file tracking database which files are to be cached.) In dynamic mode, if, in step 212 the subject file is a tracked file, it is cached in the ZCache in accordance with cache policy (either as writethrough or writeback). File flags associated with the subject file are ignored in manual mode and honored in dynamic mode. In particular, in a Windows NT environment, a FO_NO_INTERMEDIATE_BUFFERING flag is ignored in manual mode (and honored in dynamic mode), and likewise an analogous flag in other OS environments. If the subject file is an untracked file, process 200 proceeds to step 214.

Untracked files include metadata and files that may have been opened before the caching process started. Metadata files are files that contain descriptions of data such as information concerning the location of files and directories; log files to recover corrupt volumes and flags which indicate bad clusters on a physical disk. Metadata can represent a significant portion of the I/O to a physical persistent store because the contents of small files (e.g., <4,096 bytes) may be completely stored in metadata files. In step 214 it is determined if non-conservative caching is enabled. In an embodiment of the present invention using file tracking flags 21, FIG. 2E, step 214 may be performed by examining Default flag 24, FIG. 2D. If the value of Default flag 24 is the hex digit representing "writeback," then non-conservative caching is enabled, and decision block 214 proceeds by the "Y" branch. Conversely, if the value of Default flag 24 is the hex digit representing "no cache,", then non-conservative caching is disabled, and decision block 214 proceeds by the "N" branch, and the respective file operation is passed to the OS for handling (step 208).

In step 214, it is determined if the subject file is a pagefile. If so, in step 214 it is determined if caching of pagefiles is enabled. The flag 28 (FIG. 2E) has the value representing page file I/O. Pagefile I/O is passed to the OS for handling.

Process 200 having determined that the subject data is to be cached, in step 220 file object information is extracted from the I/O request packet and stored in the file tracking DB, step 222 (FIG. 6). Such data may include any policy flags set by the application issuing the subject I/O request. If, for example, in a Windows NT environment, the FO_WRITE_THROUGH flag is set in the packet descriptor the WRITE_THROUGH flag 28, FIG. 2E, may be set in step 222. Similarly, if the FO_NO_INTERMEDIATE_BUFFERING is set in the I/O request packet, then the NO_BUFF flag 28 may be set in step 222. Additionally, sequential file access flags, for example, also may be stored.

Figure 7B:
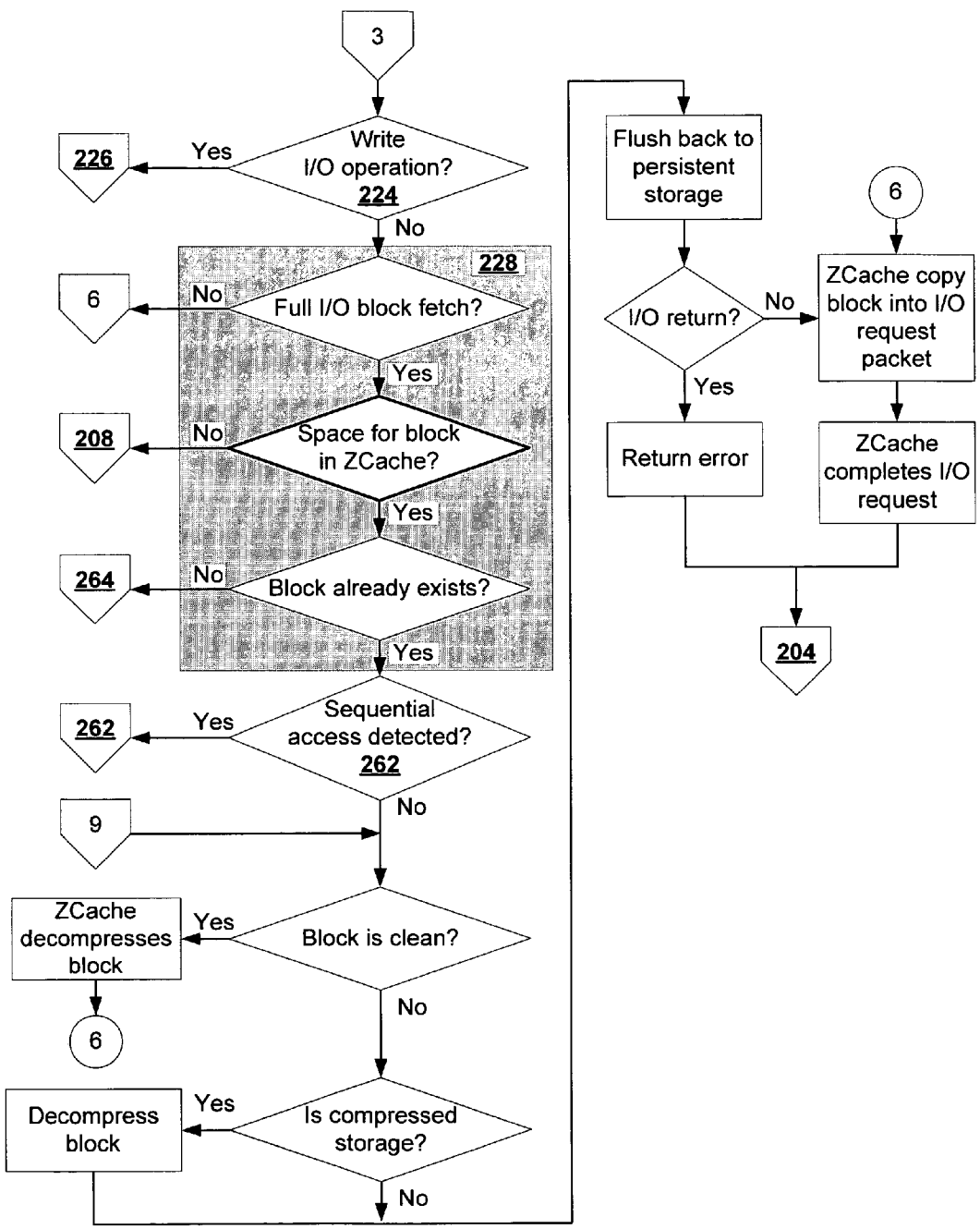

In FIG. 7B, if the I/O request is a write, process 200 proceeds by the "Y" branch in step 224, to step 226. If the request is not a write request, decision block 224 proceeds by the "No" branch to decision block 228, to determine if the request is a read.

Figure 7C:
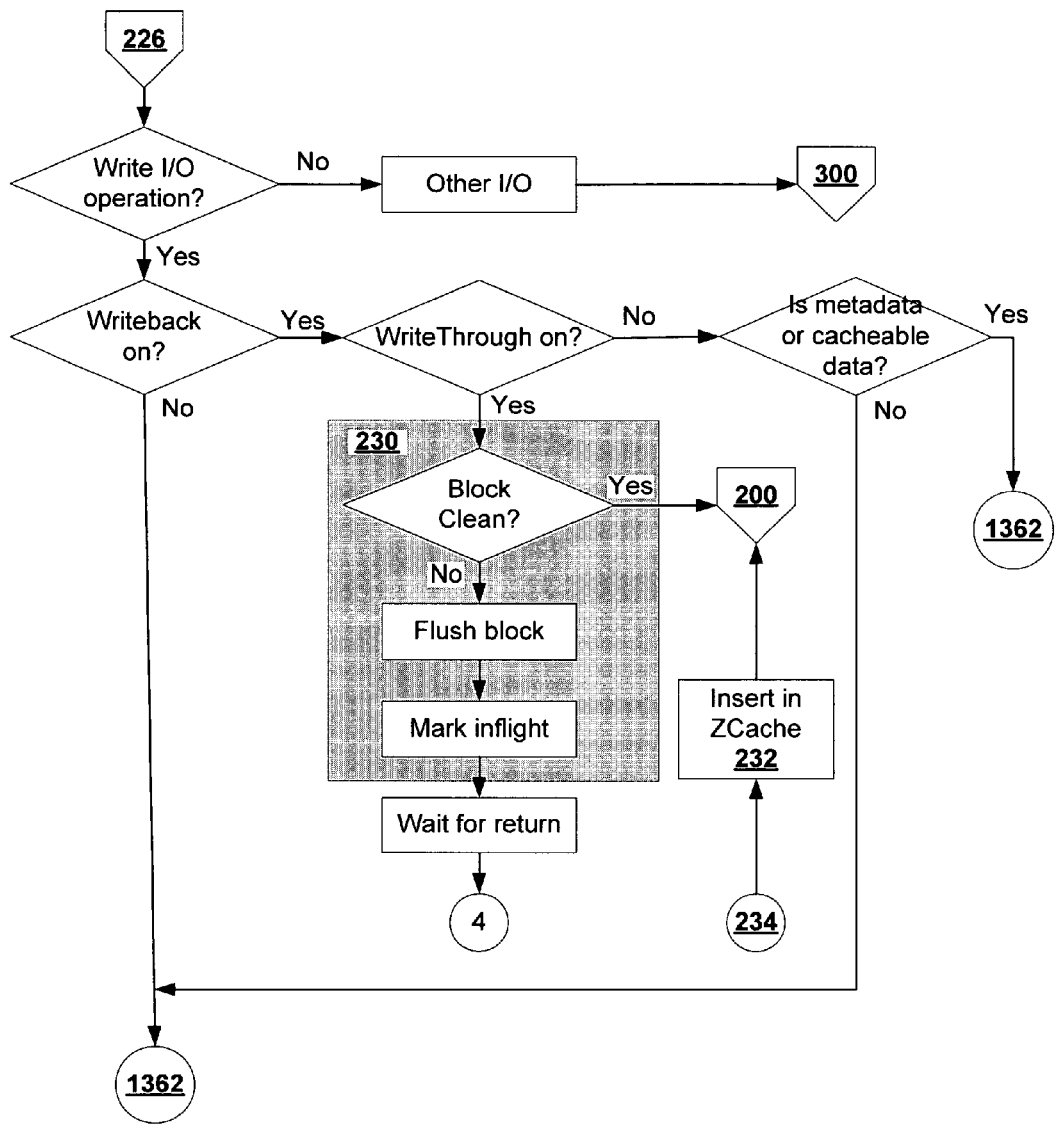

In step 226 (FIG. 7C), storage space in the ZCache is reserved, and in step 230, a miss counter associated with the subject data block to be cached is cleared. Each such block may have a corresponding tag that represents a fixed-size block of data. For example, a block size, which is normally equivalent to the PAGE SIZE of a computer processor that would execute the instructions for carrying out the method of the present invention, of 4,096 bytes may be used in an embodiment of the present invention, however other block sizes may be used in accordance with the present inventive principles, as shown in FIG. 7E, schematically illustrating a block tag 300 which may be stored in the file tracking database Block tag 300 may be viewed as a data structure having a plurality of members including counter member 302 including miss counter 304. Counter member 302 may, in an embodiment of the present invention may be one-byte wide, and miss counter 304 may be one bit wide ("true/false"). The operation of the miss counter will be discussed further herein below.

In step 232 (FIG. 7C), a compression estimation is made. The amount of compression that may be achieved on any particular block is determined by the degree of redundancy in the data block, in accordance with the classic theory information of Shannon. A block of data that is perfectly random has a maximum entropy in this picture and does not compress. An estimation of the entropy of the subject block may be used as a measure of the maximum compression that may be achieved for that block. Different data compression techniques are known in the art, and the "better" the compressor, the closer the compression ratio achieved will be to the entropy-theoretic value. However, the greater compression comes at the price of computational complexity, or, equivalently, CPU cycles. Thus, although memory may be saved by the higher compression ratios, the savings may come at the price of reduced responsiveness because of the added CPU burden. In other words, different compression schemes may be employed to trade off space and time. In an embodiment of the present invention, an entropy estimate may be made using a frequency table for the data representation used. Such frequency tables are used in the cryptographic arts and represent the statistical properties of the data. For example, for ASCII data, a 256-entry relative frequency table may be used. Frequency tables are often used in cryptography and compression; they are pre-built tables used for predicting the probability frequency of presumed alphabetic token occurrences in a data stream. In this embodiment, the token stream is presumed to be ASCII-encoded tokens, but is not restricted to this. For computational convenience, the entropy may be returned as a signed integer value in the range±50. A maximal entropy block would return the value 50. The entropy estimate may also be stored in the block tag (tag member 310, FIG. 3). The value of the entropy estimate may be used to select a compressor, step 234 or the value of the entropy estimate may also be used to provide a bias to pre-fetching for previously seen read data blocks.

Figure 7D:
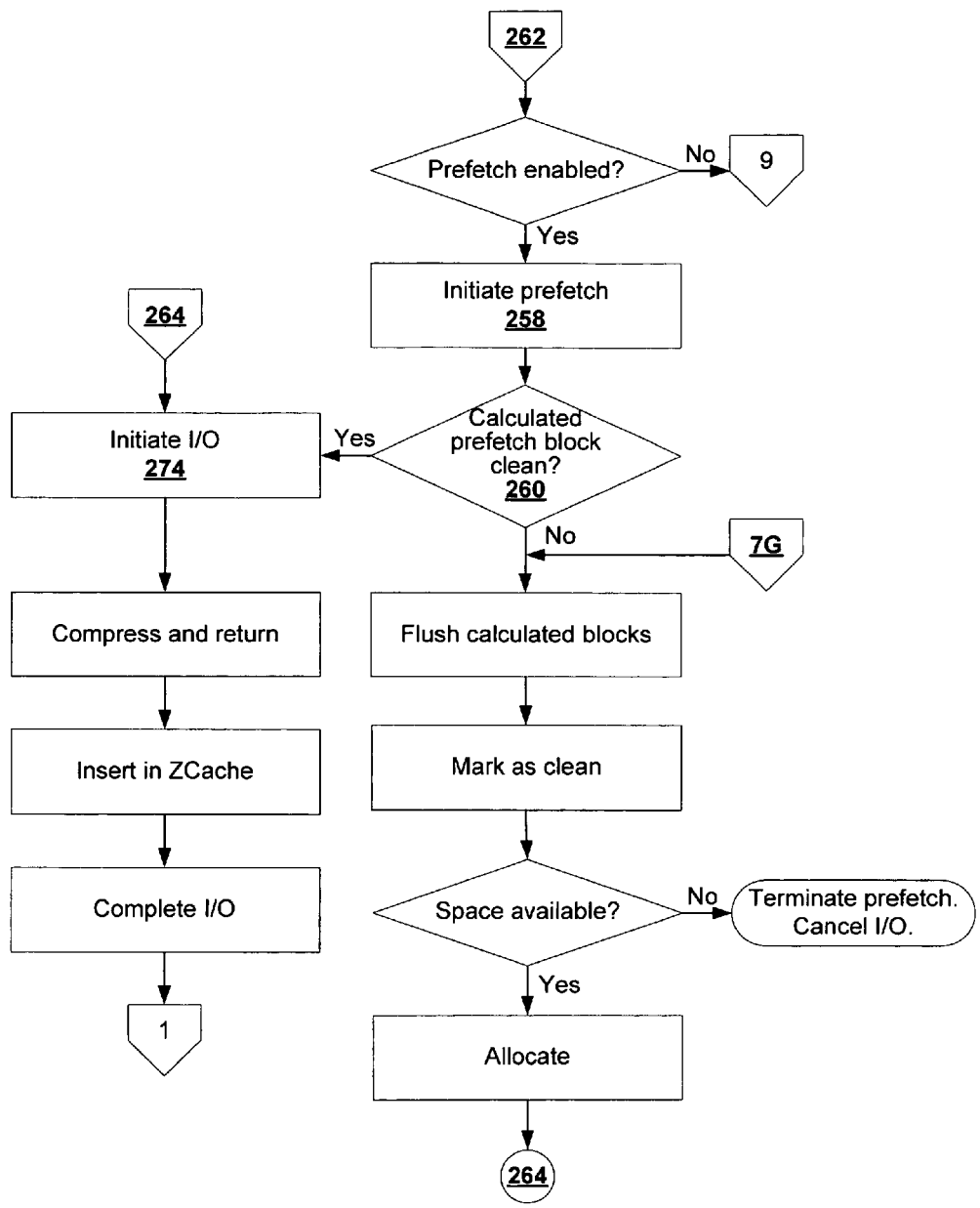
Figure 7F:
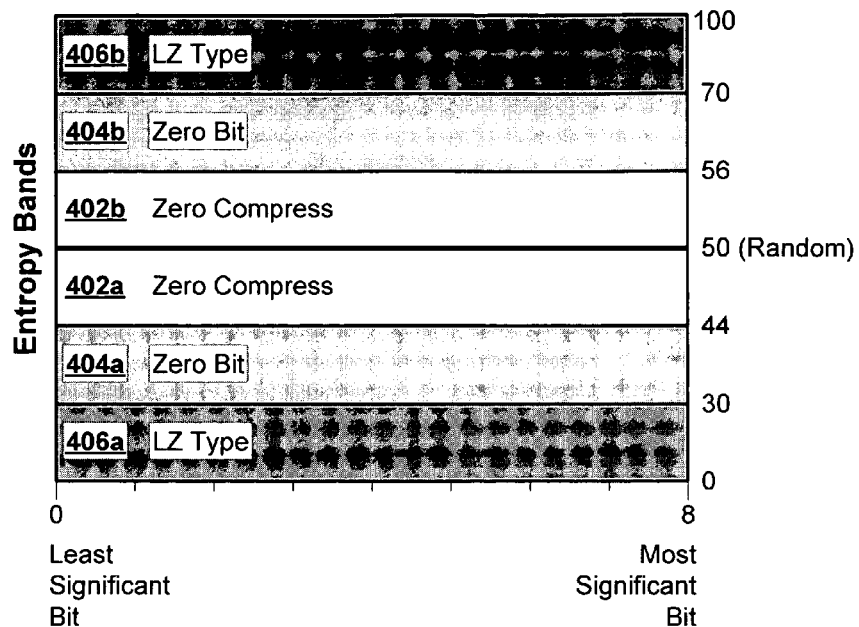
FIG. 7F schematically depicts a set of entropy bands about the maximum-entropy watermark which have pre-selected relative widths about the maximum-entropy watermark.
Figure 7G:
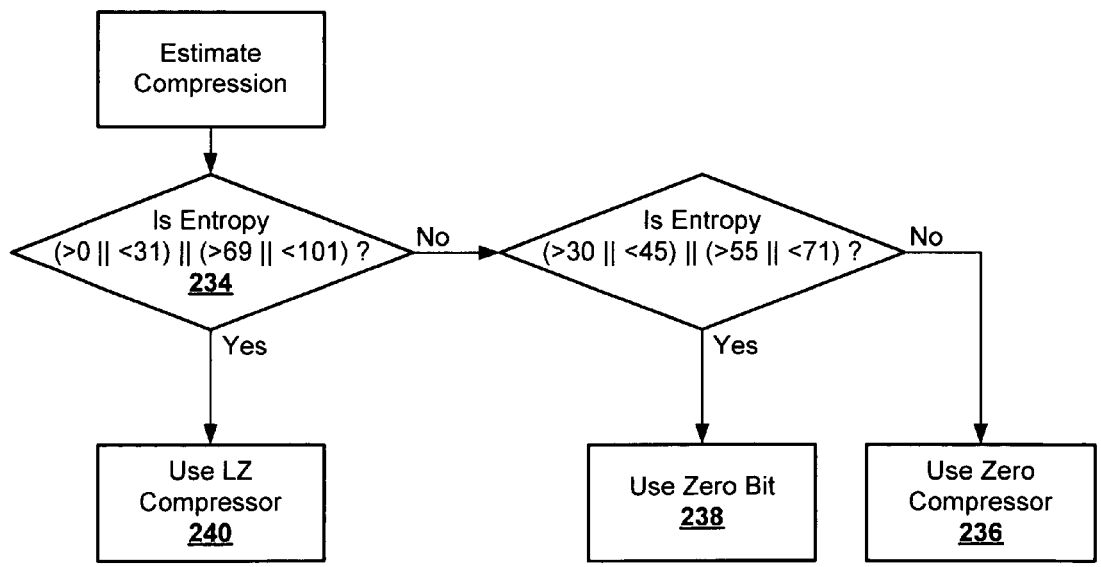
FIG. 7G, 8A-8J are flow diagrams illustrating implementation details in accordance with an embodiment of the present invention.
Figure 8A:
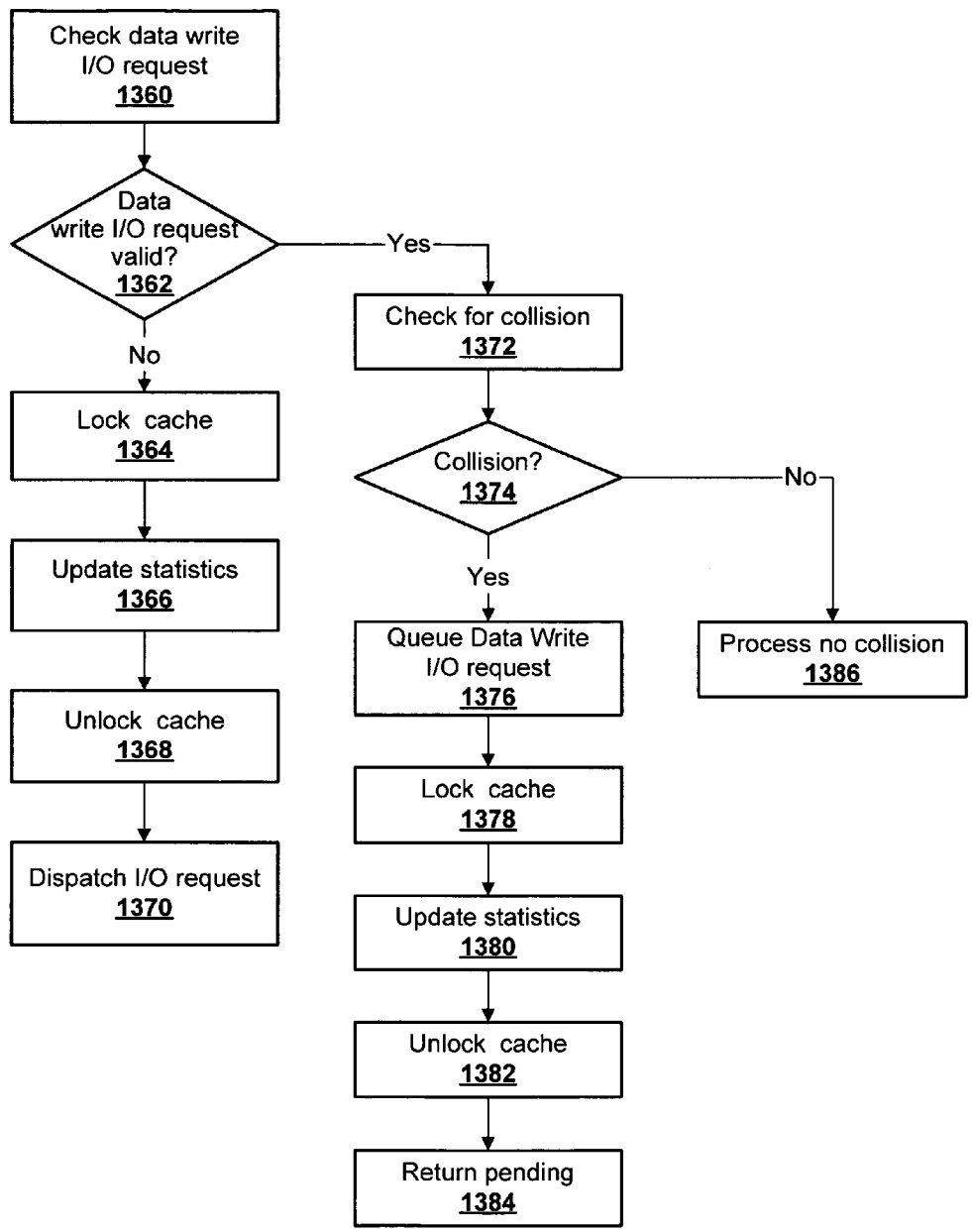
Figures 8B, 8C:
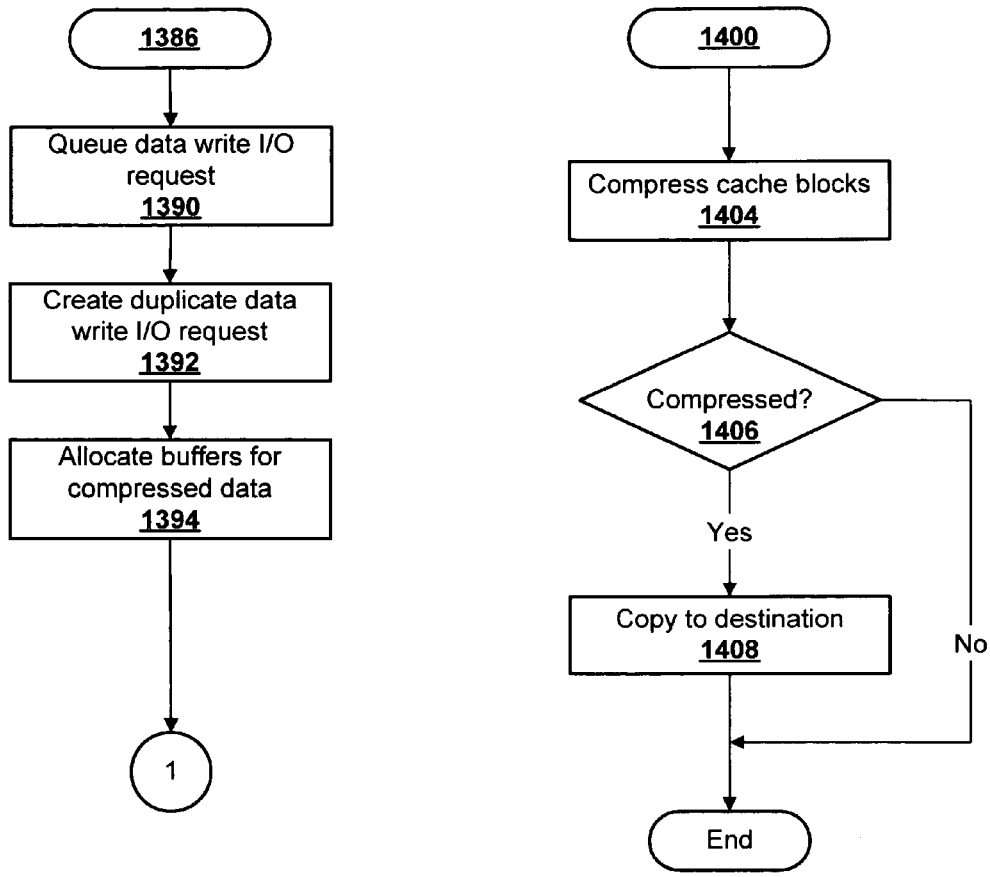
Figure 8D:
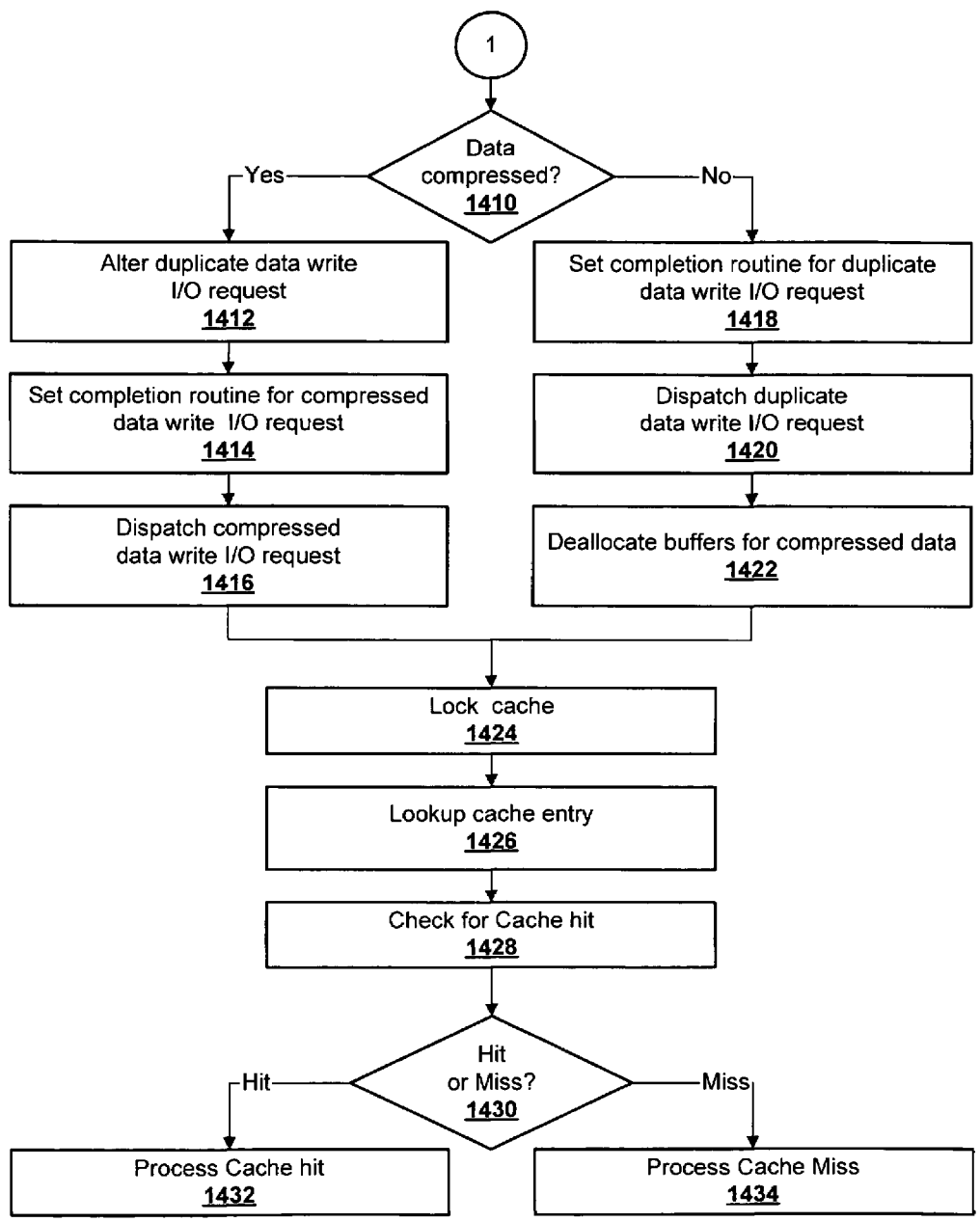
Figure 8E:
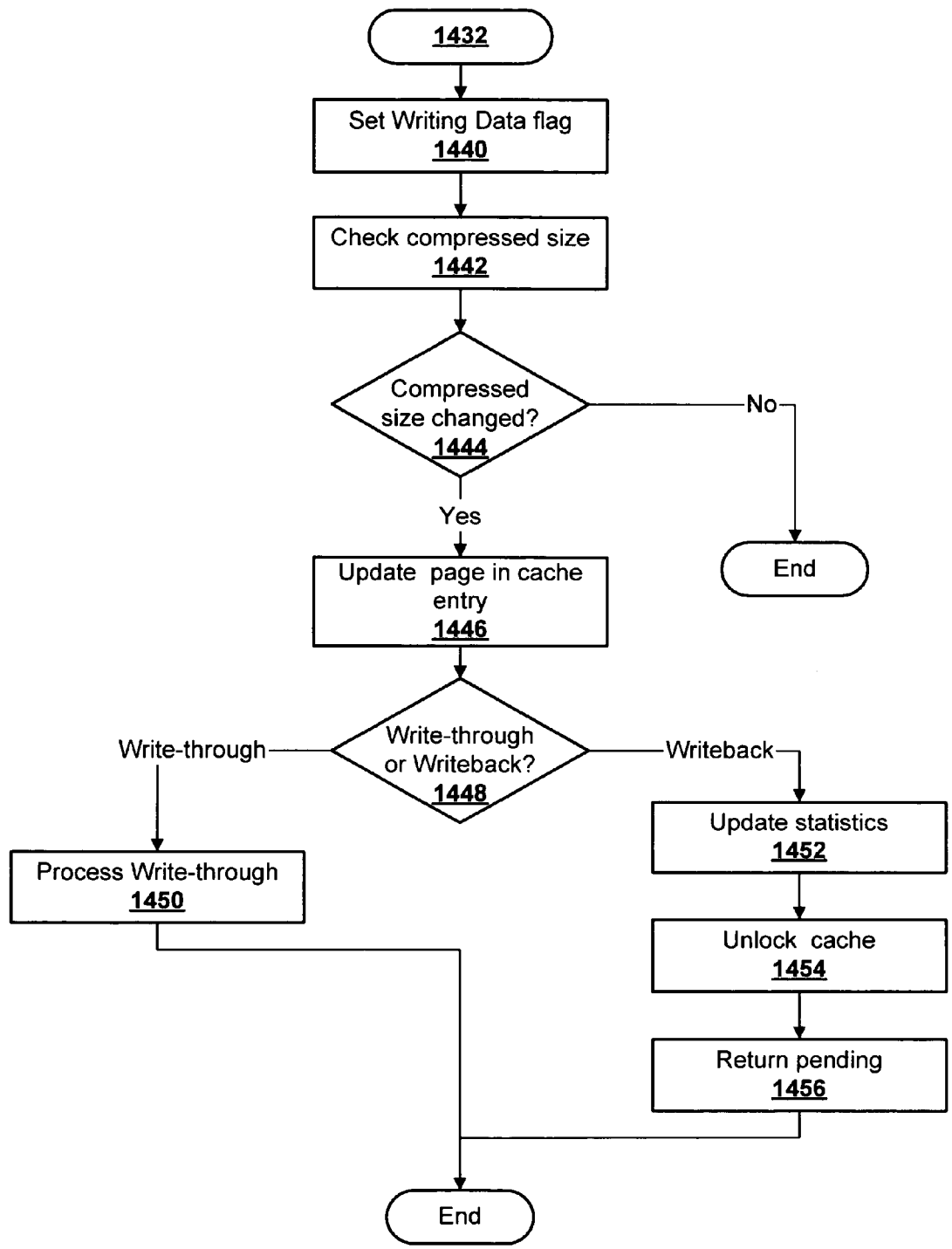
Figure 8F:
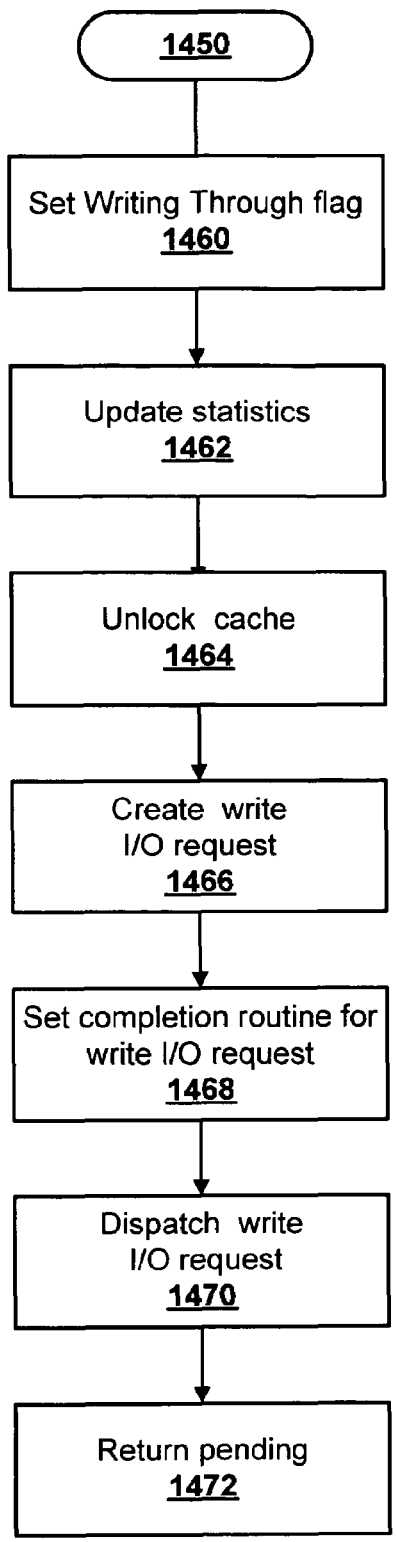
Figure 8G:
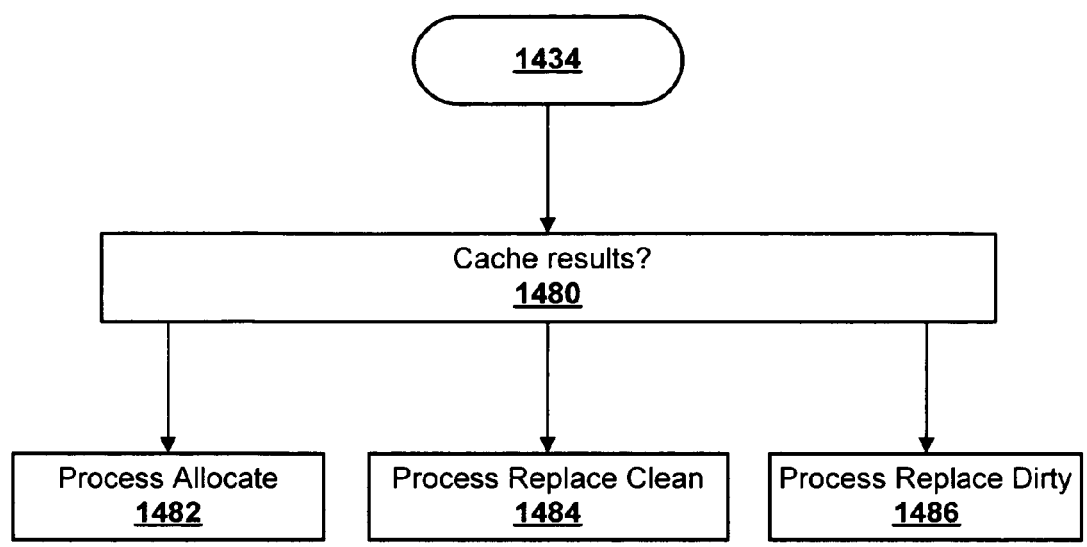
Figure 8H:
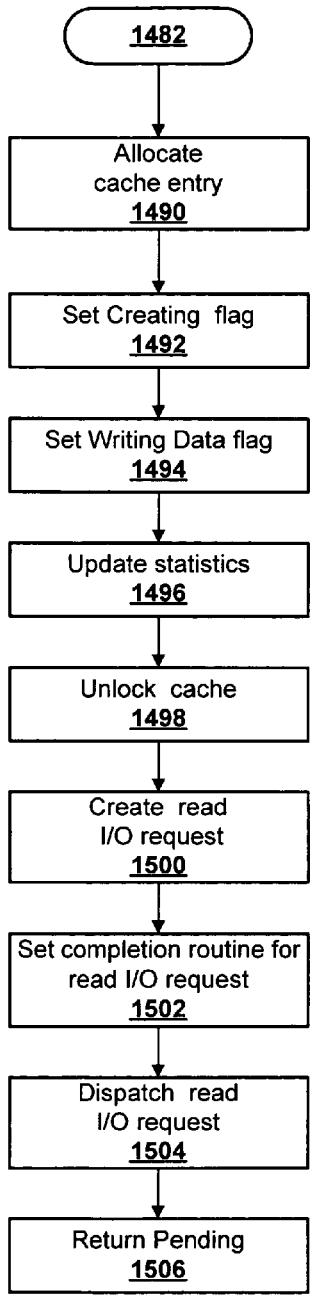
Figure 8I:
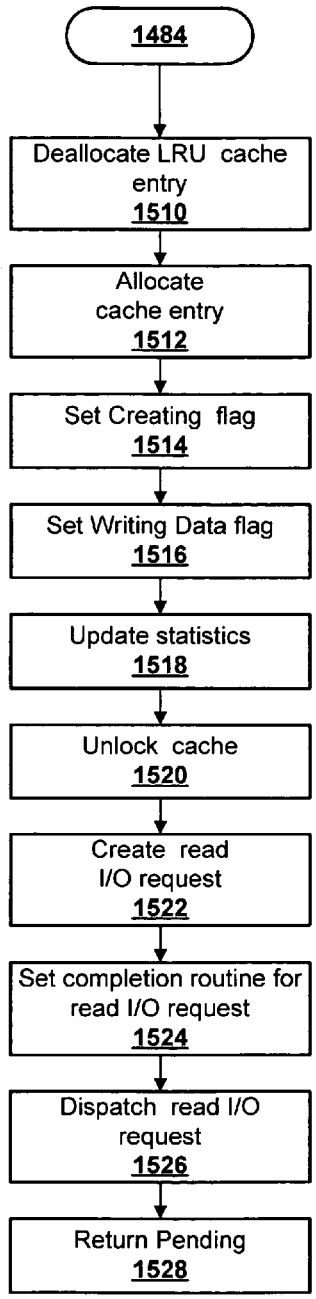
Figure 8J:
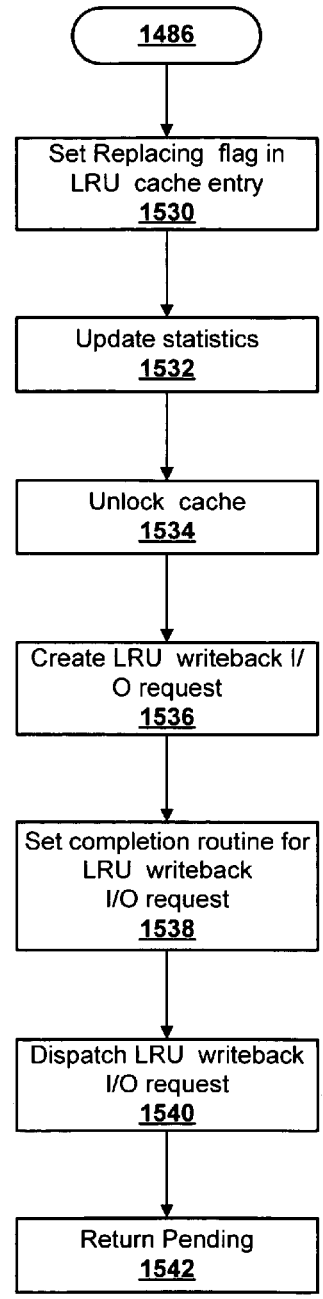

In step 234, which may be viewed as a three-way decision block if three levels of compression are provided, the subject data block is compressed using an entropy estimate based compressor selection. This may be further understood by referring to FIG. 7F. FIG. 7F schematically depicts a set of entropy bands about the 15 maximum-entropy watermark (which may correspond to a value of zero for a random block) which have pre-selected relative widths about the maximum entropy watermark. Thus, bands 402a and 402b are shown with a width of 6%, and represent a block that deviates by a relatively small amount from a random block and would be expected to benefit little from compression. Therefore, in step 234, FIG. 7G, zero compression, 236 may be selected. In other words, such a block may be cached without compression. If the entropy estimate returns a value in bands 404a, 404b, shown with a width of 14%, a zero-bit compressor 238, FIG. 2C may be selected. A zero-bit compressor counts the number of zeros occurring before a one occurs in the word. The zeros are replaced by the value representing the number of zeros. If the entropy estimate returns a value in bands 406a, 406b, having an illustrated width of 30%, a more sophisticated compression may be used, as the degree of compression expected may warrant the additional CPU cycles that such a compressor would consume. In step 234, a compressor of the Lempel-Ziv (LZ) type 240 may be selected. LZ type compressors are based on the concept, described by A. Ziv and J. Lempel in 1977, of parsing strings from a finite alphabet into substrings of different lengths (not greater than a predetermined maximum) and a coding scheme that maps the substrings into code words of fixed length, also predetermined. The substrings are selected so they have about equal probability of occurrence. Algorithms for implementing LZ type compression are known in the art, for example, the lzw algorithm described in U.S. Pat. No. 4,558,302 issued to Welch on Dec. 10, 1985, and the 1 zo compressors of Markus F. X. J. Oberhumer, available from Oberhumer.com GmbH. The type of compressor used and the compression ratio attained may be stored in the block tag, FIG. 7E, 312, 314, respectively. Bands may be added for other compressor types known to the art such as Burroughs-Wheeler (BWT) or PPM (Prediction by Partial Match).

Moreover, the bands may be adaptively adjusted. If, for example, the CPU is being underutilized, it may be advantageous to use a more aggressive compressor, even if the additional compression might not otherwise be worth the tradeoff. In this circumstance, the width of bands 404a, b and 406a, b may be expanded. Conversely, if CPU cycles are at a premium relative to memory, it may be advantageous to increase the width of bands 402a, b, and shrink the width of bands 406a, b. A methodology for adapting the compressor selection is described in conjunction with FIG. 7F.

In FIGS. 8A-8J, the data is cached, and any unused space reserved is freed. It is determined if the cached data block previously existed on the persistent store (e.g., disk). If not, an I/O packet of equal size to the uncompressed data block is issued to the persistent store. In this way, the persistent store reserves the space for a subsequent flush, which may also occur if the OS crashes. Additionally, if a read comes in the block will be returned without waiting for the I/O packet request to complete, in accordance with the writeback mechanism. If the block previously existed on the persistent store, or if the cache policy for the block is writethrough (overriding the writeback default), the block is written to the persistent store. Otherwise, the block is scheduled for a flush. Additionally, a "write squashing" may be implemented whereby flushes coming through from the OS are suppressed. In this way, process 200 may lay down contiguous blocks at one time, to avoid fragmenting the persistent store. Process 200 then returns to step 208.

Returning to step 288 in FIG. 7B, if the request is a read request, in FIG. 7E, the prefetch and miss counters of the subject block are reset, and reference counters for all blocks updated. A methodology for updating the reference counter for a block will be described in conjunction with FIG. 7D, below. In step 258 (FIG. 7E), it is determined if the block has been previously read. This may be determined by a non-zero access count in number of accesses member 316, FIG. 7E.

If the block has been previously read, in step 260 it is determined if a gap prediction is stored in the tag (e.g., gap prediction member 318, FIG. 7E). Gap prediction is accomplished by testing the distance in Logical Blocks (LBN's) from one read request in a file to a subsequent read request on the same file, if the LBN's are not adjacent (e.g. each read takes place at the next higher or lower LBN associated with this file) but there is a regular skip pattern (e.g., a read is done, some, regular, number of LBN's is skipped, either positively or negatively, a subsequent read is issued at this skipped distance) that has been detected from at least two previous reads of this file. If gap prediction has been detected then prefetching will continue as if normal sequential access had been detected, to the length of the gap. If so, in step 260 it is determined if a reference counter in the next block in the sequence is smaller than two. If a block that has been prefetched is not hit in the next two references, then it will not be prefetched again, unless its entropy estimation is approximately equal plus or minus 2% (this value is arrived at empirically and may be different for different operating systems or platforms) to the entropy of the previously fetched block, and process 200 bypasses step 264.

Otherwise, in step 264 the next sequential block is prefetched and a prefetch counter is set for the block. Referring to FIG. 7E, counter member 302 may, in an embodiment of the present invention, be one-byte wide, and may contain a prefetch counter 306 which may be one bit wide ("true/false").

Returning to step 258, if the block has not been previously read, in FIG. 7F an entropy estimate is made for the block (using the same technique as in step 232) that is stored in the file tracking database (e.g., in compression estimate member 310, FIG. 7E). A next block is then selected for prefetching based on entropy and distance (FIG. 7E). That is, of the blocks nearest in entropy (once again within 2%), the closest block in distance to the subject block of the read request is prefetched. (Recall that a block has a unique entropy value, but a given entropy value may map into a multiplicity of blocks.) If, however, in FIG. 7E the miss counter for the selected block is set, prefetching of that block is bypassed ("Y" branch of decision block). Otherwise, in step 274, the block is prefetched, and the miss counter (e.g., miss counter 304, FIG. 7E) for the prefetched block is set (or logically "True"). The prefetch counter is set in step 266, as before.

Similarly, if there is no gap prediction, a prefetch based on solely on entropy is performed via the "No" branch of decision block 260.

In step 204 the read is returned.

Figure 9:
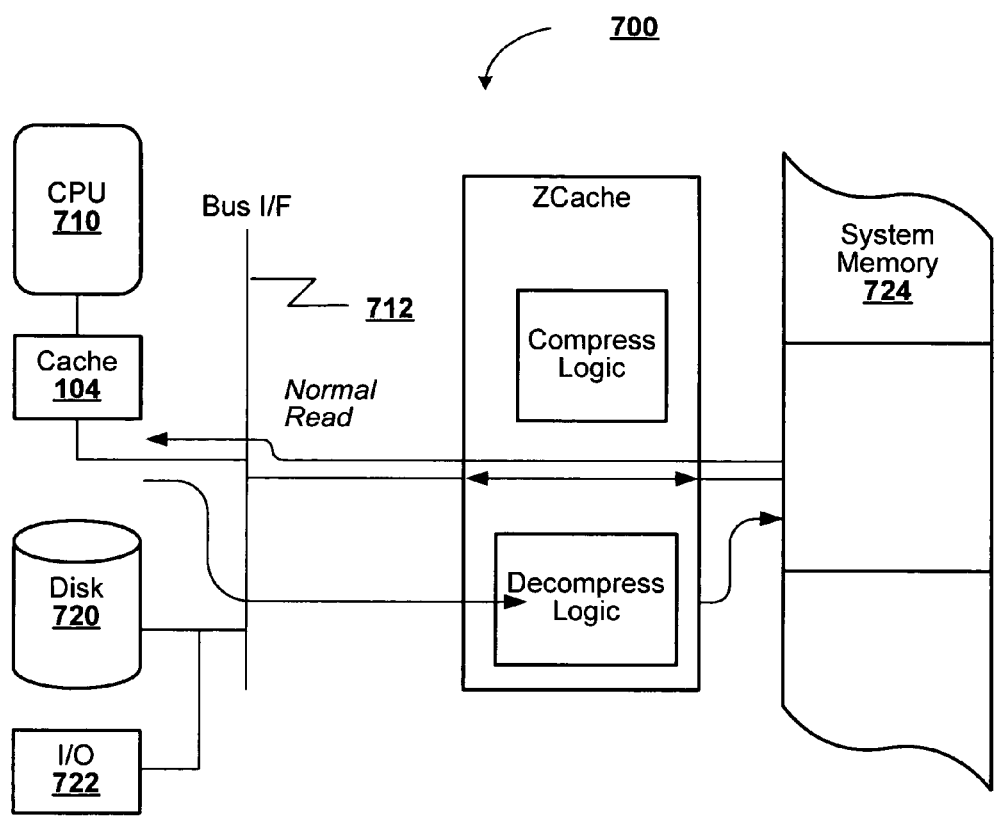
FIG. 9 illustrates an exemplary hardware configuration of a data processing system in accordance with the present invention.

FIG. 9 illustrates an exemplary hardware configuration of data processing system 700 in accordance with the subject invention. The system in conjunction with the methodologies illustrated in FIG. 5 and architecture 100, FIG. 2C may be used for data caching in accordance with the present inventive principles. Data processing system 700 includes central processing unit (CPU) 710, such as a conventional microprocessor, and a number of other units interconnected via system bus 712. Data processing system 700 may also include random access memory (RAM) 714, read only memory (ROM) (not shown) and input/output (I/O) adapter 722 for connecting peripheral devices such as disk units 720 to bus 712. System 700 may also include communication adapter for connecting data processing system 700 to a data processing network, enabling the system to communicate with other systems. CPU 710 may include other circuitry not shown herein, which will include circuitry commonly found within a microprocessor, e.g., execution units, bus interface units, arithmetic logic units, etc. CPU 710 may also reside on a single integrated circuit.

Preferred implementations of the invention include implementations as a computer system programmed to execute the method or methods described herein, and as a computer program product. According to the computer system implementation, sets of instructions for executing the method or methods are resident in the random access memory 714 of one or more computer systems configured generally as described above. These sets of instructions, in conjunction with system components that execute them may perform operations in conjunction with data block caching as described hereinabove. Until required by the computer system, the set of instructions may be stored as a computer program product in another computer memory, for example, in disk drive 720 (which may include a removable memory such as an optical disk or floppy disk for eventual use in the disk drive 720). Further, the computer program product can also be stored at another computer and transmitted to the user's workstation by a network or by an external network such as the Internet. One skilled in the art would appreciate that the physical storage of the sets of instructions physically changes the medium upon which is the stored so that the medium carries computer-readable information. The change may be electrical, magnetic, chemical, biological, or some other physical change. While it is convenient to describe the invention in terms of instructions, symbols, characters, or the like, the reader should remember that all of these in similar terms should be associated with the appropriate physical elements.

Note that the invention may describe terms such as comparing, validating, selecting, identifying, or other terms that could be associated with a human operator. However, for at least a number of the operations described herein which form part of at least one of the embodiments, no action by a human operator is desirable. The operations described are, in large part, machine operations processing electrical signals to generate other electrical signals.

What is claimed is:

1. A method, comprising:
    estimating an entropy value for a data block to be cached in response to a data input/output (I/O) request;
    comparing the estimated entropy value to a plurality of predetermined entropy values;
    storing the data block in a cache if, according to said comparing, the estimated entropy value is within a first range of entropy values;
    if the estimated entropy value is not within the first range of entropy values;
        selecting one of a plurality of compressors that corresponds to a range of entropy values that includes the estimated entropy value;
        compressing the data block using the selected compressor; and
        storing the compressed data block in the cache.

2. The method of claim 1, wherein the first range of entropy values and the range of entropy values corresponding to the selected compressor are within a plurality of ranges of entropy values, the method further comprising adaptively adjusting the plurality of ranges of entropy values.

3. The method of claim 1, further comprising:
    scheduling a flush of the compressed or uncompressed data block from the cache.

4. The method of claim 3, further comprising suppressing operating system flushes in conjunction with said scheduling.

5. The method of claim 1, further comprising selecting corresponding caching policies for the data block.

6. The method of claim 5, wherein said selecting the corresponding caching policies for the data block is performed dynamically.

7. The method of claim 1, further comprising disassembling I/O request packets corresponding to the data I/O request to control handling of I/O operations corresponding to the data I/O request.

8. The method of claim 7, wherein said disassembling the I/O request packets includes selecting corresponding caching policies for the data block.

9. The method of claim 8, wherein said selecting the corresponding caching policies for the data block is performed based on user-selectable caching policies in combination with caching instructions set by an application issuing the data I/O request.

10. The method of claim 1, wherein the estimated entropy value is a measure of a maximum compression that may be achieved for the data block.

11. The method of claim 1, wherein said estimating is performed using a frequency table including statistical properties corresponding to a data representation used for the data block.

12. The method of claim 11, wherein the frequency table is a pre-built table usable to predict a probability frequency of presumed alphabetic token occurrences comprised in the data block.

13. The method of claim 1, further comprising applying, based on said estimating, an entropy bias to previously processed data blocks.

14. The method of claim 13, further comprising prefetching one or more of the previously processed data blocks with the applied entropy bias.

15. A method for caching data, the method comprising:
    detecting a data input/output (I/O) request corresponding to an I/O data packet;
    selecting caching policies for the I/O data packet
    in response to the data I/O request, estimating an entropy value for a first data block to be cached;
    storing the first data block in a cache in compressed form using a compressor corresponding to a range of entropy values that includes the estimated entropy value, or in uncompressed form if the entropy value falls in a first range of entropy values; and
    prefetching a second data block using gap prediction with an applied entropy bias.

16. The method of claim 15, further comprising adaptively adjusting the plurality of ranges of entropy values.

17. The method of claim 15, further comprising scheduling a flush of the first data block from the cache.

18. The method of claim 17, further comprising suppressing operating system flushes in conjunction with said scheduling.

19. The method of claim 15, wherein said selecting is performed dynamically.

20. The method of claim 15, wherein said selecting is performed manually.

21. A computer-readable memory medium storing program instructions that are computer-executable to:
    detect an input/output (I/O) request corresponding to a data block;
    determine that the data block is to be cached;
    in response to the I/O request, identify caching policies for the data block;
    estimate an entropy value for the data block, wherein the estimated entropy value is a measure of a maximum compression that may be achieved for the data block;
    depending on the estimated entropy value, compress the data block using a compressor corresponding to a range of entropy values that includes the estimated entropy value;
    if the data block was compressed, store the compressed data block in a cache memory; otherwise, store the data block in the cache memory.

22. The computer-readable memory medium of claim 21, wherein the program instructions are computer-executable to disassemble corresponding one or more I/O request packets that control handling of I/O operations.

23. The computer-readable memory medium of claim 21, wherein the program instructions are computer-executable to:
    select the caching policies from user-selectable caching policies; or
    select the caching policies from user-selectable caching policies in combination with caching instructions set by an application making the I/O request.

24. The computer-readable memory medium of claim 21, wherein the I/O request includes one or more I/O packets that include information usable to control caching of the data block.

25. The computer-readable memory medium of claim 24, wherein the program instructions are computer-executable to determine caching policies from the information for controlling caching of the data block.

26. The computer-readable memory medium of claim 21, wherein the program instructions are computer-executable to apply, based on the estimated entropy value, an entropy bias to previously processed data blocks.

27. The computer-readable memory medium of claim 26, wherein the program instructions are computer-executable to prefetch one ore more of the previously processed data blocks using gap prediction with the applied entropy bias.

28. The computer-readable memory medium of claim 21, wherein the program instructions are computer-executable to store the estimated entropy value in a cache tag corresponding to the data block.

29. A computer system comprising:
    one or more processors;
    a cache memory coupled to at least one of the one or more processors; and
    a memory storing program instructions executable to implement an operating system and further storing program instructions executable by the one or more processors to:
        receive an input/output (I/O) request;
        determine whether a data block corresponding to the I/O request is to be cached;
        if the data block is determined to be cached:
            identify caching policies corresponding to the data block;
            estimate an entropy value for the data block, wherein the estimated entropy value is a measure of a maximum compression that may be achieved on the data block;
            select a compressor from a plurality of compressors according to the estimated entropy value, wherein each of the plurality of compressors corresponds to one of a plurality of ranges of entropy values relative to a predetermined entropy value;
            depending on the estimated entropy value, compress the data block using a compressor corresponding to a first range of entropy values that includes the estimated entropy value;
            if the data block was compressed, store the compressed data block in the cache memory; otherwise, store the data block in the cache memory.

30. The computer system of claim 29, wherein the program instructions are executable to pass the I/O request to the operating system without caching the data block if it was determined that the data block is not to be cached.

31. The computer system of claim 30, wherein the program instructions are executable to determine that the data block is not to be cached when:
    the data block is ignored;
    the cache memory is not enabled; or
    the data block is not eligible for caching.

32. The computer system of claim 29, wherein the program instructions are executable to store the estimated entropy value in a cache tag corresponding to the data block if a determination was made not to cache the data block.

33. The computer system of claim 29, wherein the program instructions are executable to select one or more caching policies corresponding to the data block if a determination was made to cache the data block.

34. The computer system of claim 33, wherein the program instructions are executable to select, if a determination was made to cache the data block, the one or more caching policies based on user-selectable caching policies in combination with caching instructions set by an application issuing the data I/O request.

35. The computer system of claim 29, wherein the program instructions are executable to estimate, if a determination was made to cache the data block, the entropy value using a frequency table including statistical properties corresponding to a data representation used for the data block.

36. The computer system of claim 35, wherein the frequency table includes data indicative of probabilities of alphabetic tokens occurring at specified frequencies within the data block.

37. The computer system of claim 29, wherein the program instructions are executable to apply an entropy bias to previously processed data blocks, based on the estimated entropy value.

38. The computer system of claim 29, wherein the program instructions are executable to adaptively adjust the plurality of ranges of entropy values to set compression levels according to processor cycles available to perform compression of the data block.

39. The computer system of claim 38, wherein the program instructions are executable to adjust the plurality of ranges of entropy values to use a compressor that provides a higher level of compression of output data if the one or more processors are being underutilized.

40. A computer system comprising:
    a system bus;
    a processor coupled to the system bus;
    a cache memory coupled to the processor; and a memory coupled to the system bus, and storing program instructions executable by the processor to:
receive an input/output (I/O) request;
determine whether a data block corresponding to the I/O request is to be cached;
identify caching policies corresponding to the data block, in response to determining whether the data block is to be cached;
estimate an entropy value for the data block, in response to determining whether the data block is to be cached;
depending on the estimated entropy value, compress the data block using a compressor corresponding to a range of entropy values that includes the estimated entropy value;
store the compressed data block in the cache memory if the data block was compressed; and
store the data block in the cache memory if the data block was not compressed.

* * * * *

UNITED STATES PATENT AND TRADEMARK OFFICE
CERTIFICATE OF CORRECTION

| | | |
|---|---|---|
| PATENT NO. | : 7,430,638 B2 | Page 1 of 1 |
| APPLICATION NO. | : 11/152363 | |
| DATED | : September 30, 2008 | |
| INVENTOR(S) | : Kellar | |

It is certified that error appears in the above-identified patent and that said Letters Patent is hereby corrected as shown below:

Title page:

Please add
-- (60) Related U.S. Application Data
    Provisional application No. 60/579,344, filed on Jun. 14, 2004. --.

In the Specification:

Column 1
    Line 4, please add
-- CROSS REFERENCE TO RELATED APPLICATIONS
    This patent application claims the benefit of the earlier filed U.S. Provisional Patent Application entitled "Adaptive Input / Output Cache And System Using Same", having Ser. No. 60/579,344, and filed June 14, 2004. --.

Column 11
    Line 40, please delete "1 zo" and substitute -- lzo --.

Signed and Sealed this

Sixteenth Day of December, 2008

JON W. DUDAS
*Director of the United States Patent and Trademark Office*